(12) United States Patent
Rangaiah et al.

(10) Patent No.: US 10,353,790 B1
(45) Date of Patent: Jul. 16, 2019

(54) DISASTER RECOVERY REHEARSALS

(71) Applicant: Veritas Technologies LLC, Mountain View, CA (US)

(72) Inventors: Jagadamba Rangaiah, Mountain View, CA (US); Kushal B. Shah, Santa Clara, CA (US); Henry A. Aloysius, San Jose, CA (US); Meenal Binwade, Sunnyvale, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 16 days.

(21) Appl. No.: 14/954,440

(22) Filed: Nov. 30, 2015

Related U.S. Application Data

(60) Provisional application No. 62/104,046, filed on Jan. 15, 2015, provisional application No. 62/188,730, filed on Jul. 5, 2015, provisional application No. 62/234,786, filed on Sep. 30, 2015.

(51) Int. Cl.
| | |
|---|---|
| *G06F 11/26* | (2006.01) |
| *G06F 11/263* | (2006.01) |
| *G06F 11/14* | (2006.01) |

(52) U.S. Cl.
CPC ........ *G06F 11/263* (2013.01); *G06F 11/1451* (2013.01); *G06F 11/1469* (2013.01); *G06F 2201/84* (2013.01)

(58) Field of Classification Search
CPC ............................... G06F 11/00; G06F 11/263
USPC ........................................................... 714/1
See application file for complete search history.

(56) References Cited

U.S. PATENT DOCUMENTS

| | | | | |
|---|---|---|---|---|
| 8,359,491 B1* | 1/2013 | Bloomstein | ......... | G06F 11/1662 714/6.3 |
| 8,554,727 B2* | 10/2013 | Atluri | ................. | G06F 11/1464 707/613 |
| 9,075,704 B2* | 7/2015 | Zaheer | .................... | G06F 11/00 |
| 9,274,903 B1* | 3/2016 | Garlapati | ............ | G06F 11/2002 |
| 2007/0186068 A1* | 8/2007 | Agrawal | ............ | G06F 11/1456 711/162 |
| 2007/0271304 A1* | 11/2007 | Atluri | ................. | G06F 11/1464 |
| 2008/0109804 A1* | 5/2008 | Bloomstein | ......... | G06F 9/45533 718/1 |
| 2010/0145909 A1* | 6/2010 | Ngo | .................... | G06F 11/1471 707/611 |
| 2014/0215255 A1* | 7/2014 | Zaheer | ................. | G06F 11/004 714/1 |
| 2016/0139836 A1* | 5/2016 | Nallathambi | ......... | G06F 3/0619 711/114 |
| 2016/0203013 A1* | 7/2016 | Bayapuneni | ........ | G06F 9/45545 718/1 |

\* cited by examiner

*Primary Examiner* — Kamini B Patel
(74) *Attorney, Agent, or Firm* — Campbell Stephenson LLP

(57) ABSTRACT

Various systems and methods for configuring and performing DR rehearsal operations. One method involves initiating a disaster recovery rehearsal for an application. The method involves generating a snapshot of a first storage element used by the application. The method also involves configuring a second storage element and starting an instance of the application. Starting the instance of the application utilizes the snapshot and the second storage element. Generating the snapshot, configuring the second storage element, and starting the instance of the application are performed in response to initiating the DR rehearsal.

15 Claims, 20 Drawing Sheets

DISASTER RECOVERY REHEARSALS

RELATED APPLICATIONS

This application claims the benefit under 35 U.S.C. § 119(e) of U.S. Provisional Patent Application No. 62/104,046 filed on Jan. 15, 2015, entitled "Management of and Data Recovery for Virtual Data Processing Systems," which is hereby incorporated by reference herein in its entirety. This application claims the benefit under 35 U.S.C. § 119(e) of U.S. Provisional Patent Application No. 62/188,730 filed on Jul. 5, 2015, entitled "Management of and Data Recovery for Virtual Data Processing Systems," which is hereby incorporated by reference herein in its entirety. This application claims the benefit under 35 U.S.C. § 119(e) of U.S. Provisional Patent Application No. 62/234,786 filed on Sep. 30, 2015, entitled "Disaster Recovery Rehearsals," which is hereby incorporated by reference herein in its entirety.

FIELD OF THE DISCLOSURE

The present disclosure relates generally to data protection, and more specifically to the protection of data across multiple networked sites.

BACKGROUND OF THE INVENTION

Computing systems and data are important resources that are often crucial to the operations of various types of organizations, such as business enterprises and governmental entities. Failures that affect the computing systems and data used by organizations may cause periods of unplanned downtime and data loss that could threaten an organization's productivity, reputation, and bottom line. Organizations are becoming increasingly aware of these risks and are taking measures to plan for and recover from such failures.

As modern computing environments become increasingly complex, adequately protecting these important resources can also become increasingly difficult. Consider, as an example, a data center that implements one or more applications. The applications may be logically inter-related or inter-related by virtue of their common dependence on virtualization technology, various shared storage configurations, and multiple types of network access. The field of disaster recovery has as an objective the ability to ensure that in the event of some unplanned occurrence, such as a natural disaster, terrorist attack, or other catastrophic failure, the computing systems and data used by the applications running in such an environment are protected from unexpected unavailability. Doing so involves the establishment and maintenance of disaster recovery systems.

Testing of disaster recovery systems is good practice and increases confidence that the disaster recovery systems are able to effectively protect the resources the disaster recovery systems are intended to protect. However, there are challenges associated with testing disaster recovery systems. For example, doing so can affect both the functioning of the resources being protected, and the readiness of disaster recovery systems to respond to disasters. It is desirable to prevent any impact or interference that could result from testing the disaster recovery systems.

BRIEF DESCRIPTION OF THE DRAWINGS

The present disclosure may be better understood, and its numerous objects, features and advantages made apparent to those skilled in the art by referencing the accompanying drawings.

Figure 1:
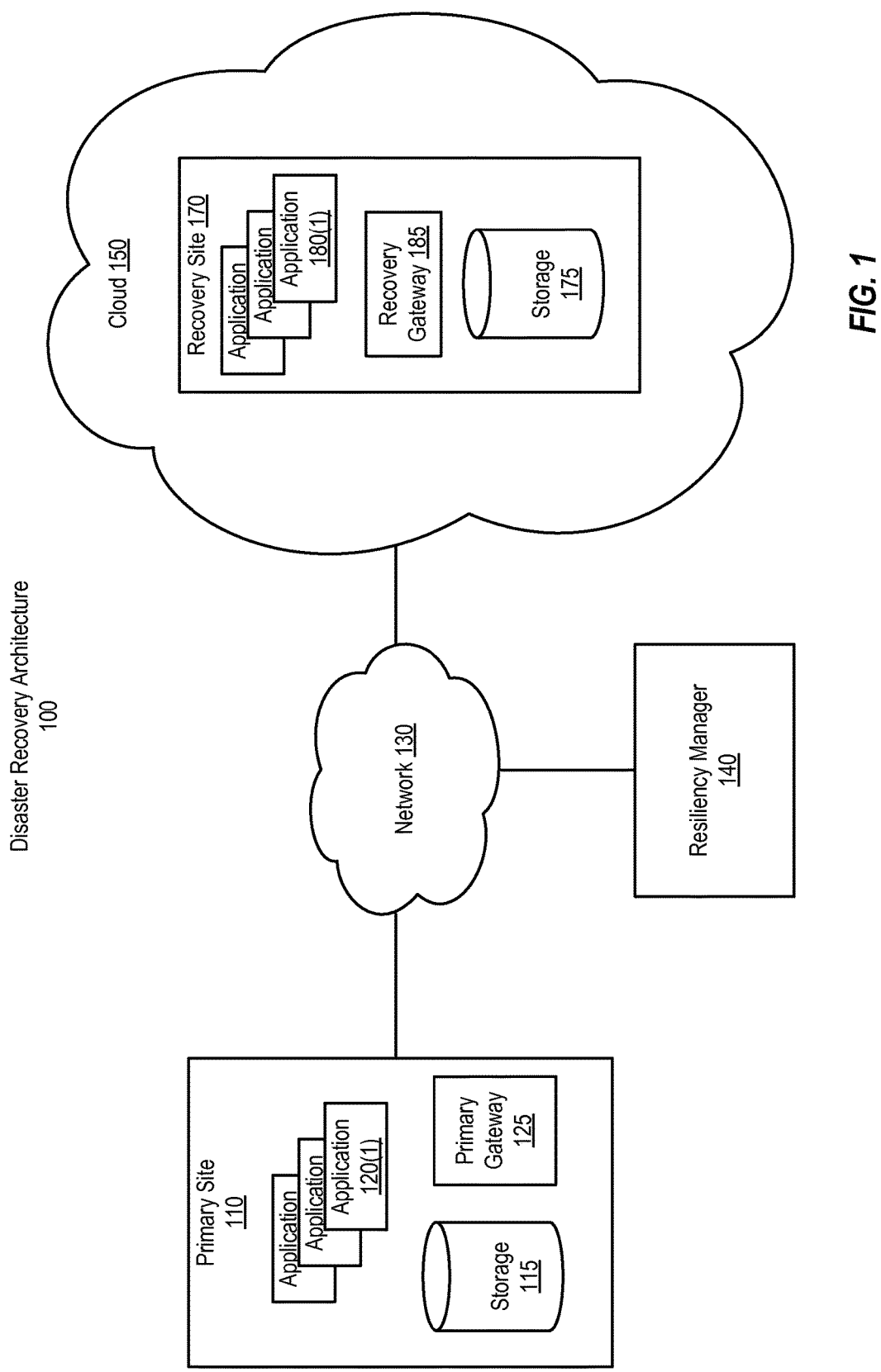
FIG. 1 is a block diagram illustrating certain components of an example computing environment, according to the present description.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Various systems and methods for configuring and performing DR rehearsal operations are described herein. One embodiment involves initiating a disaster recovery rehearsal for an application. The method involves generating a snapshot of a first storage element used by the application. The method also involves configuring a second storage element and starting an instance of the application. Starting the instance of the application utilizes the snapshot and the second storage element. Generating the snapshot, configuring the second storage element, and starting the instance of the application are performed in response to initiating the DR rehearsal.

Modern computing environments often include any number of applications. Configuring these computing environments for disaster recovery (DR) typically involves taking steps to ensure that following a disaster or failure of some sort, some or all of the applications can be restarted in a separate computing environment. Goals of DR include restarting the applications in a timely manner and preventing data loss. Due to the complexity and importance of DR operations, it is advisable to test DR operations prior to the occurrence of a disaster, lest a DR operation fail to complete successfully when needed. Testing a DR operation is known as a DR rehearsal, or fire drill.

Typically, a DR rehearsal involves bringing an application down in a primary site, restarting the application in a recovery site, and testing the application. In typical disaster recovery systems, an attempt to start an application on-premises, that is either in the recovery site or on the primary site, while the application is still running in the primary site could lead to errors in execution of the application due, for example, to resource confusion and contention. That is, if such a configuration were allowed, users of the application would be unable to discern which of the two instances should be used, and commands and data could be divided between the two instances in a haphazard and unpredictable fashion, leading to inaccurate data and resultant errors. Thus, the portions of applications that can be tested in a recovery site without impacting the production or primary site are extremely limited in conventional disaster recovery systems. In conventional DR systems, after the testing is completed, the application is taken offline in the recovery site and restarted in the primary site. As can be seen, typical DR rehearsals involve making the application unavailable to users for a period of time. DR rehearsals are typically scheduled for times when user-impact can be as low as possible, such as nights or weekends.

In addition to the impact on operations of the primary site, typical DR rehearsals suffer from a number of additional drawbacks. For example, if a disaster that affects a primary site occurs while a DR rehearsal is ongoing in a recovery site, the recovery site may be unable perform disaster recovery. Doing so could result in multiple instances of an application running in a single network, which can lead to errors, as discussed above. This can lead to data loss and/or unavailability of applications. Also, typical DR rehearsals tend to be relatively limited in scope. For example, in conventional disaster recovery systems, DR rehearsal is only supported for single applications. However, many applications in modern computing environments are implemented as multi-tiered applications that include multiple applications utilizing various distinct and heterogeneous software and hardware platforms. Conventional disaster recovery systems are not capable of effectively executing DR rehearsals for such complex applications.

Another problem with typical DR rehearsals is that typical DR rehearsals involve generation of a workflow tailored for the specific application configuration in place at the time the DR rehearsal is configured. Typical DR rehearsals are inflexible in that the pre-configured workflows are fixed and don't react to dynamic changes in configuration that could affect a DR operation. Additionally, most typical DR rehearsals involve extensive user involvement. A user, such as a DR administrator, manually configures the workflow to be used. Manually configuring DR rehearsals is typically relatively slow and prone to user error.

Disclosed herein are systems and methods for efficiently configuring and performing DR rehearsal operations. The disclosed DR rehearsals solve the problems mentioned above, as well as providing other inventive and useful embodiments, as described below.

FIG. 1 shows a computing environment configured to perform DR and DR rehearsals. As shown in FIG. 1, disaster recovery architecture 100 includes primary site 110, recovery 170, and resiliency manager 140. Recovery site 170 is shown as being implemented in cloud 150. These elements are coupled to one another via network 130. Network 130 can include a WAN (Wide Area Network), such as the Internet, one or more LANs (Local Area Networks), and/or one or more SANs (Storage Area Networks). As used herein, the term site, whether applied to a primary site, a recovery site, or a rehearsal site, refers to one or more computing devices, such as hosts and storage devices, that are coupled to one another via a high-speed communications medium, such as a local area network, as well as various software assets implemented by the computing devices. The computing devices of a site are generally located within a single geographic area, such as a single building or in multiple buildings in a single campus. The distance between computing devices of a single site is relatively small as compared to the distance between sites.

Cloud 150, as shown in FIG. 1, is a cloud computing environment. Cloud computing involves cloud vendors providing computing resources, such as storage, to customers on a pay-for-service basis. This enables an enterprise, for example, to use computing resources without having to acquire and maintain the physical computing assets, e.g., server computers, associated with the computing resources. Instead, the enterprise can contract with a cloud vendor for computing resources. The enterprise can specify the quantity and characteristics of the computing resources the enterprise wishes to use. Cloud computing can be used to establish multiple isolated networks. That is, it is possible in cloud computing environments to set up multiple sites, such as recovery sites and rehearsal sites, that are logically disconnected. Cloud computing resources can be configured such that multiple instances of an application can be brought up in the cloud, e.g., one in each of multiple sites, without there being any risk of the multiple instances of the application interfering with each other. In one embodiment, the cloud includes persistent block-based storage devices. Volumes, or other logical groupings, are created, e.g., by the cloud provider or an application provided by the cloud provider, using some of the block-based storage. The volumes may be attached and detached from instances of applications, but generally can be attached to only one instance at a time. Similar to an external hard drive, the volumes do not provide shared storage in the way a network file system or object store does. In one embodiment, an application that uses the volume provides a file system for the volume and mounts the volume.

Figure 2:
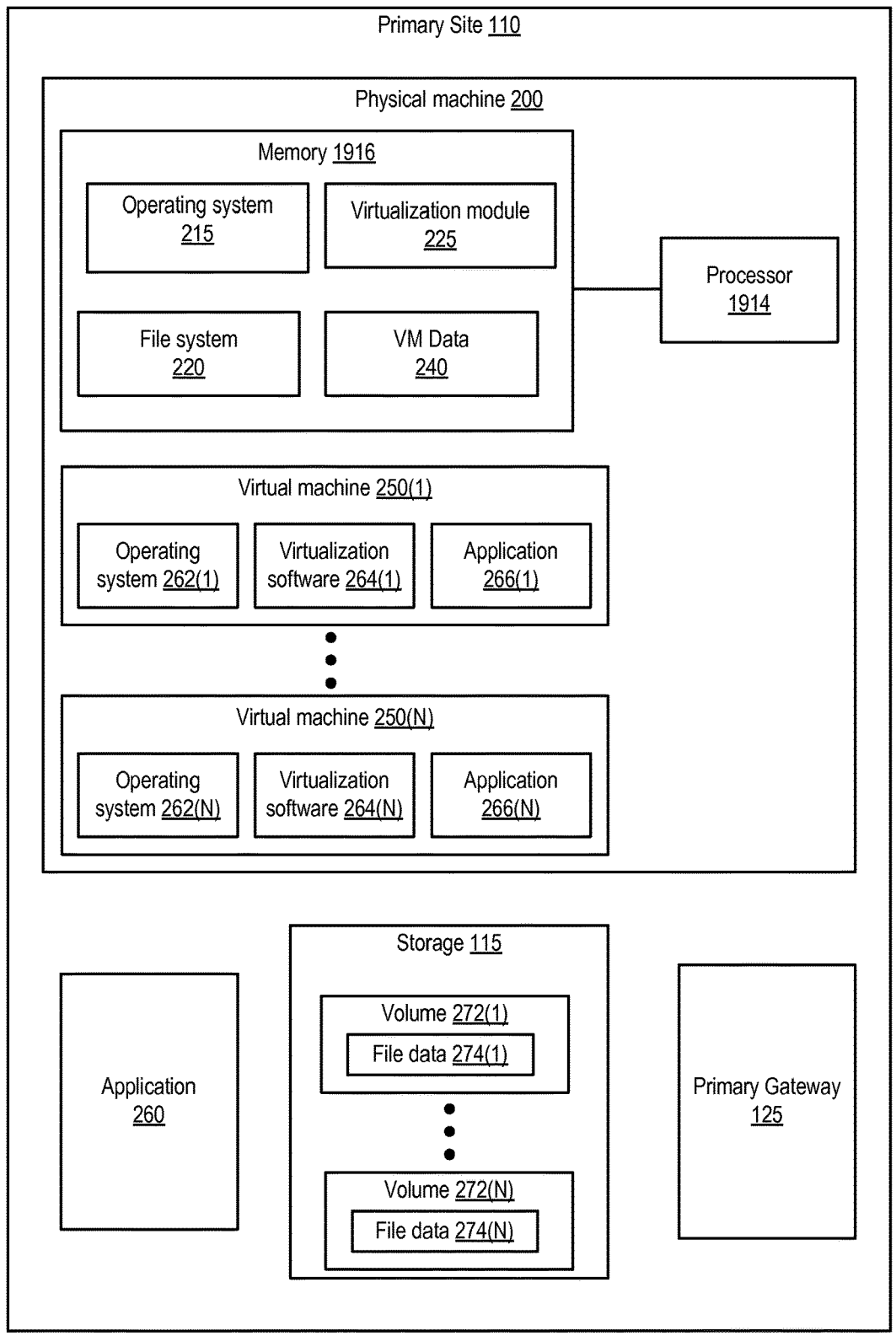
FIG. 2 is a block diagram illustrating certain components of an example computing environment, according to the present description.

Primary site 110, as shown in FIG. 1 and as described in greater detail with regard to FIG. 2, includes several applications 120, primary gateway 125, and storage 115. Applications 120 can be DR enabled. For example, if a disaster occurs that effects one or more applications at primary site 110, a DR operation can be performed whereby the applications of primary site 110 are be restarted in recovery site 170. DR operations are intended to prevent data loss and extended periods of inaccessibility to the objects. Since primary site 110 is geographically remote from recovery site 170, the likelihood of a single disaster affecting both primary site 110 and recovery site 170 is low.

As used herein, the term "application" may actually refer to a logical conglomeration including several applications, with each application utilizing different hardware, software, and virtual machines. This is known as a multi-tiered application. For example, an online sales application may be implemented as a multi-tiered application that includes one or more of an upper tier, a middle tier, and a lower tier. A tier, as used herein, refers to resources, such as software applications, server computers, and data storage devices used to implement the applications of a particular layer. Layer, as used herein, refers to a logical division of computational tasks.

The upper tier of an multi-tiered application, for example, may implement one or more user interface applications, web-based applications and the like. These applications can be implemented using a specific set of server computers and data storage devices. The middle tier of the multi-tiered application may implement, for example, one or more applications that coordinates between the upper tier and a lower tier. These applications may be implemented using a different, heterogeneous set of computing resources, such as server computers and storage devices, than the upper tier. For example, in response to input or commands received via the upper tier applications, logical decisions are made by the middle tier. Such decisions concern, for example, data to be stored and/or retrieved from the lower tier of the multi-tiered application, which can include one or more database applications. The lower tier applications can be implanted by a third distinct and heterogeneous set of computing resources, such as server computers and data storage devices. Consider that some or all of these applications at each tier can be implemented using virtual machines. The virtual machines, the applications themselves, and the data accessed via the database application all utilize some form of physical storage. The data utilized in each tier can be located in one or more physical storage devices.

Figure 4A:
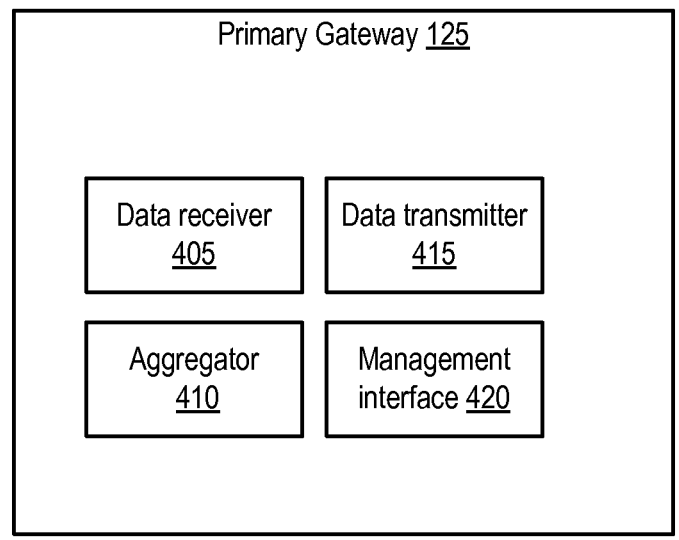
FIG. 4A is a block diagram illustrating certain components of an example computing environment, according to the present description.

Primary gateway 125, as described in more detail with regard to FIG. 4A, is configured to communicate with one or more recovery sites, such as recovery site 170. In order for recovery site 170 to be capable of performing disaster recovery operations for applications running in primary site 110, the state of the applications and data at primary site 110 is replicated to recovery site 170. Functions performed by primary gateway 125 can include capturing changes to data, e.g., changes made by applications 120 to data stored in storage 115, and replicating the changes to one or more recovery sites. Primary gateway 125 can replicate changes made by some or all of applications 120. In one embodiment, primary gateway can be dedicated to one application, such that if multiple applications are included in primary site 110, multiple gateways are included as well, with a single gateway being assigned to a single application. In another embodiment, primary gateway 125 can replicate and transmit changes and other data, such as administrative commands, for multiple applications, and can aggregate the data prior to transmission of the data to recovery site 170.

Storage 115 stores data associated with applications 120. This can include any and all data used to implement and run applications 120, such as virtual machine disk files, user data, configuration data, metadata, and the like. Storage 115 includes one or more storage devices that provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Figure 5:
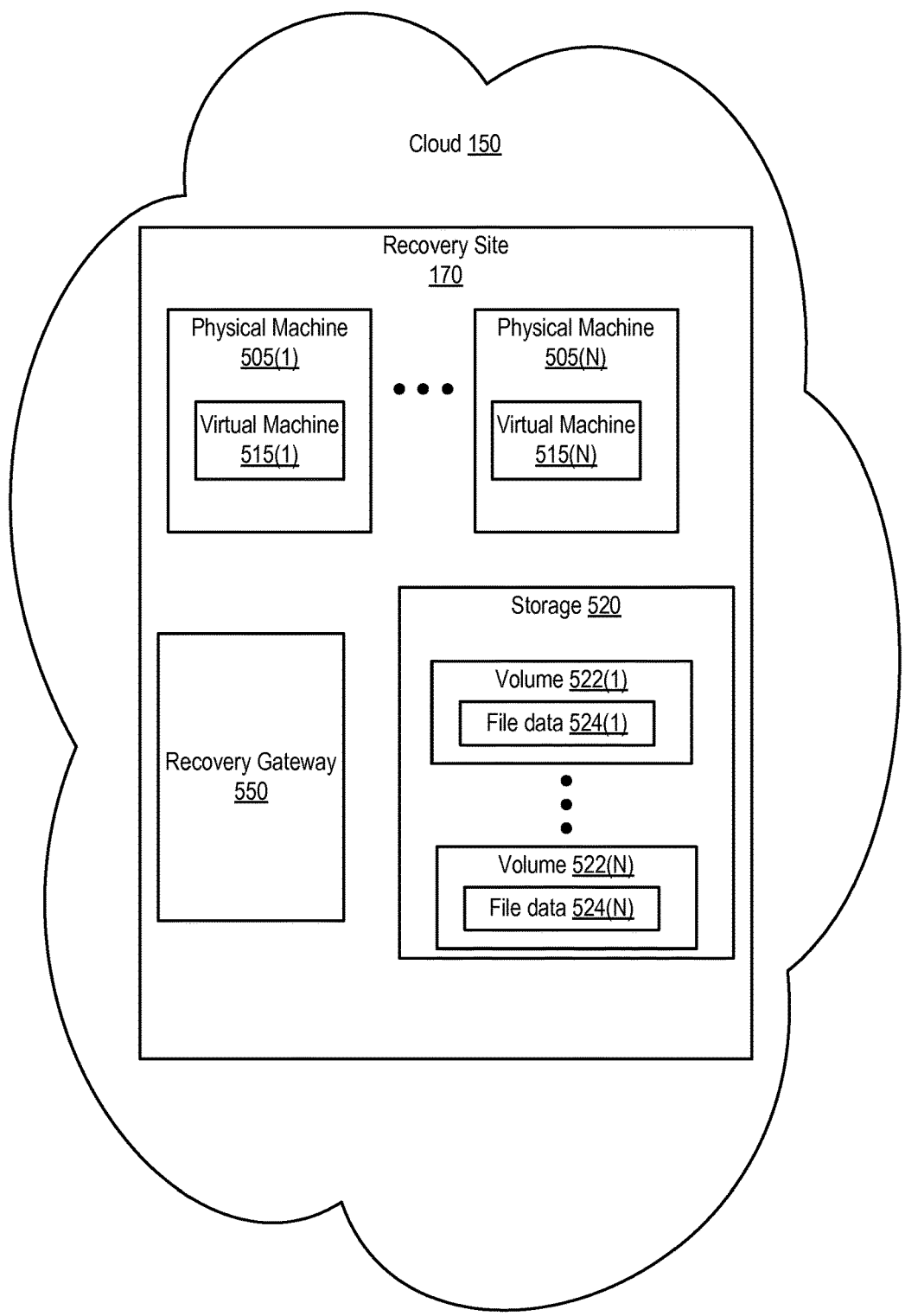
FIG. 5 is a block diagram illustrating certain components of an example computing environment, according to the present description.

Recovery site 170, as shown in FIG. 1 and further described with regard to FIG. 5, includes several applications 170, recovery gateway 185, and storage 175. Though shown as being implemented in cloud 150, recovery site may not be implemented in the cloud, and may be implemented in a data center or other suitable computing environment that satisfies the requirements for DR for primary site 110.

Recovery gateway 185 is configured to receive data from primary gateway 125. Such data includes, for example, I/O commands issued by applications 120 to affect data changes to data stored in storage 115, configuration changes to applications 120, or other information used in the configuration and execution of applications 120, including updates to user-data. Recovery gateway 185 is configured to apply the changes to storage 175 such that applications 180, which correspond to applications 120, are maintained in the same state as applications 120. Applications 180 are maintained in an offline state prior to the initiation of a disaster recovery operation or a DR rehearsal. Recovery gateway 185 keeps applications 180 up to date, such that if a disaster occurred that affected access to primary site 110, recovery site 170 could take over and provide access to applications 180 with little or no user-impact, such as data loss and application unavailability.

Applications 180 correspond to applications 120 in primary site 110. For each application, whether virtualized, multi-tier, single tier, or any other type of application, implemented in primary site 110, applications 180 include a corresponding application. Applications 180 are maintained in a state that would enable applications 180 to take over for applications 120, for example, in the event that a disaster rendered applications 120 unavailable.

Storage 175 stores data associated with applications 180. This can include any and all data used to implement and run applications 180, such as virtual machine disk files, user data, configuration data, metadata, and the like. Storage 175 includes one or more storage devices that provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Figure 6:
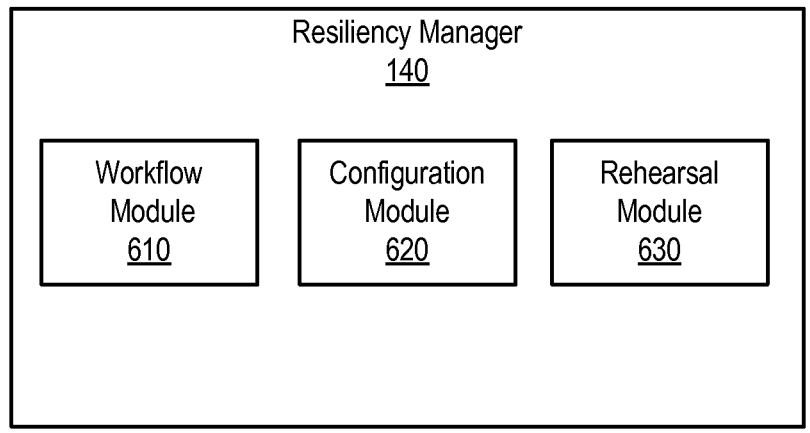
FIG. 6 is a block diagram illustrating certain components of an example computing environment, according to the present description.

Resiliency manager 140, as shown in FIG. 1 and described in greater detail with regard to FIG. 6, provides disaster recovery capabilities for applications executed in primary site 110. This involves configuring applications in primary site 110 as well as assets in recovery site 170. Resiliency manager 140 provides the potential to add new capabilities to one or more of primary site 110 and recovery site 170 on demand. Doing so leverages automatic/assisted discovery of assets to reduce administrator configuration errors, and leverages workflows in a novel manner to provide customization and extensibility to one or more of primary site 110 and recovery site 170. In one embodiment, resiliency manager 140 generates one or more commands related to performing a DR rehearsal and transmits the commands to primary site 110 and/or recovery site 170.

FIG. 2 shows additional details of primary site 110, also known as a production site. Primary site 110 is configured to run one or more applications. The assets of primary site 110 are co-located in a single geographic location, in some embodiments. Primary site 110 can be for example a data center, and can include one or more computing systems located in one or more buildings. Primary site 110 can be as small as a single computer or as large as a data center that includes thousands of computing devices. As shown in FIG. 2, primary site 110 includes a single physical machine 200, sometimes referred to as a host. It should be understood that multiple physical machines, such as physical machine 200, can be included in primary site 110. Primary site 110 also includes storage 115, application 260, and primary gateway 125.

Physical machine 200 is a computing device such as a personal computer, laptop computer, server, personal digital assistant, cell phone, or the like. Physical machine 200 includes a memory 1916 and a processor 1914. Physical machine 200 also includes virtual machines 250(1)-250(N) (collectively referred to as virtual machines 250), each of which implements one or more of applications 266(1)-266(N) (collectively referred to as applications 266).

It will be noted that the variable identifier "N" is used to more simply designate the final element (e.g., recovery site 120(N)) of a series of related or similar elements (e.g., recovery sites). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Memory 1916 includes an operating system 215. Operating system 215 controls the hardware of physical machine 200 and provides various services to applications and virtual machines executing on physical machine 200. For example, when a virtual machine 250 requests a page be brought into memory 1916, the operating system can relay the request to file system 220, which can request that the page be read, e.g., from file data 274 of storage 115. File system 220 can receive the page and write the page to memory 1916, e.g., to virtual machine data 240. File system 220 can organize storage 115 into multiple volumes 272 that store file data 274. File system 220 can also maintain a listing of the physical locations of files and data in storage 115.

Memory 1916 includes virtualization module 225. Virtualization module 225 performs operations related to creation and management of virtual machines and resources for virtual machines. Virtualization module 225 is illustrated as a stand-alone module but can also be included in operating system 215. Virtualization module 225 provides physical machine 200 the ability to concurrently support one or more virtual machines, such as virtual machines 250. Virtualization module 225 provides this ability by coordinating the distribution of computer resources (e.g., processing power, memory, etc.) to the virtual machines so that the virtual machines operate similarly to physical computers. Virtualization module 225 can be designed to support virtual machines by coordinating processor resources to support the execution of instructions on behalf of the virtual machines, and performing memory management to help ensure that the virtual machines effectively share the host computer's system memory.

Physical machine 200 includes virtual machines 250. In general terms, each virtual machine 250 is a software construct that acts as a physical computer system. For instance, virtual machines can include and execute applications, such as application 266, provide services, and process commands. A virtual machine has its own operating system 262, such as Microsoft Windows® or Unix, and can include virtualization software 264 and/or interface with virtualization software on a host, such as is provided virtualization module 225 on physical machine 200.

Primary site 110 includes application 260, which can be a single tier application or a multi-tier application. While only one application 260 is shown in FIG. 2, it is understood that primary site can include multiple applications. Application 260 can be any of a word processing program, email program, graphic editing program, database application, server program, or any other single-tier or multi-tier application.

Storage 115 can be included in whole or in part in one or more physical machines, such as physical machine 200 and/or can be coupled to one or more physical machines via a LAN or other communications media. Storage 115 includes volumes 272(1)-272(N), collectively referred to as volumes 272. These volumes store data used to implement applications, such as application 260, virtual machines 250, and applications 266. Storage 115 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Storage 115 is configured to store data, such as file data 274. File data 274 is configured to be accessed by application 260 and virtual machines 250. File data 274 represents one or more of any logical or physical unit of data, such as a file system, a file, a database, a volume, a block, an extent, a disk drive, or the like.

Primary site 110 also includes a storage configuration component (not shown) that can implemented as one or more software modules or applications configured to be used by a storage administrator to manage storage 115. Managing a storage system involves, for example: creating logical groupings, such as volumes, virtual drives, shared storage spaces, and the like; setting permissions; controlling access; organizing data; and monitoring and reporting on the health, utilization, and availability of the storage devices included in the storage system. The storage configuration component is also configured to store information regarding the storage systems managed by storage configuration component. Such information typically includes, for example, information regarding the configuration, capabilities, and utilization of the storage systems, and the storage devices therein.

Primary site 110 also includes network assets (not shown) such as physical networking assets, such as switches, bridges, DNS servers, gateways, and network interface cards, and/or virtual networking assets such as virtual switches, virtual machine port groups, and the like. The network assets include the hardware and software elements that determine how elements of a site, such as physical machine 200, communicate with each other, and how the site communicates with the outside world, such as other sites. A network configuration component (not shown) can be implemented as one or more software modules or applications configured to be used by a network administrator to set up and monitor the site's network assets, and stores network configuration information specifying the network assets configured for the site.

Primary site 110 also includes replication assets (not shown) that include software and/or hardware elements used to transfer data, such as file data 274, from one element of primary site 110 to another, or from one site to one or more other sites. Replication is performed using primary gateway 125. Primary gateway 125 can be implemented as one or more software modules or applications. Primary gateway 125 stores information identifying replication assets associated with each application for which replication is enabled. For example, primary gateway 125 can include information identifying one or more replicated volumes, replication consistency groups, replication hardware, replication array credentials, replication modes, replication schedules, and the like.

Figure 3:
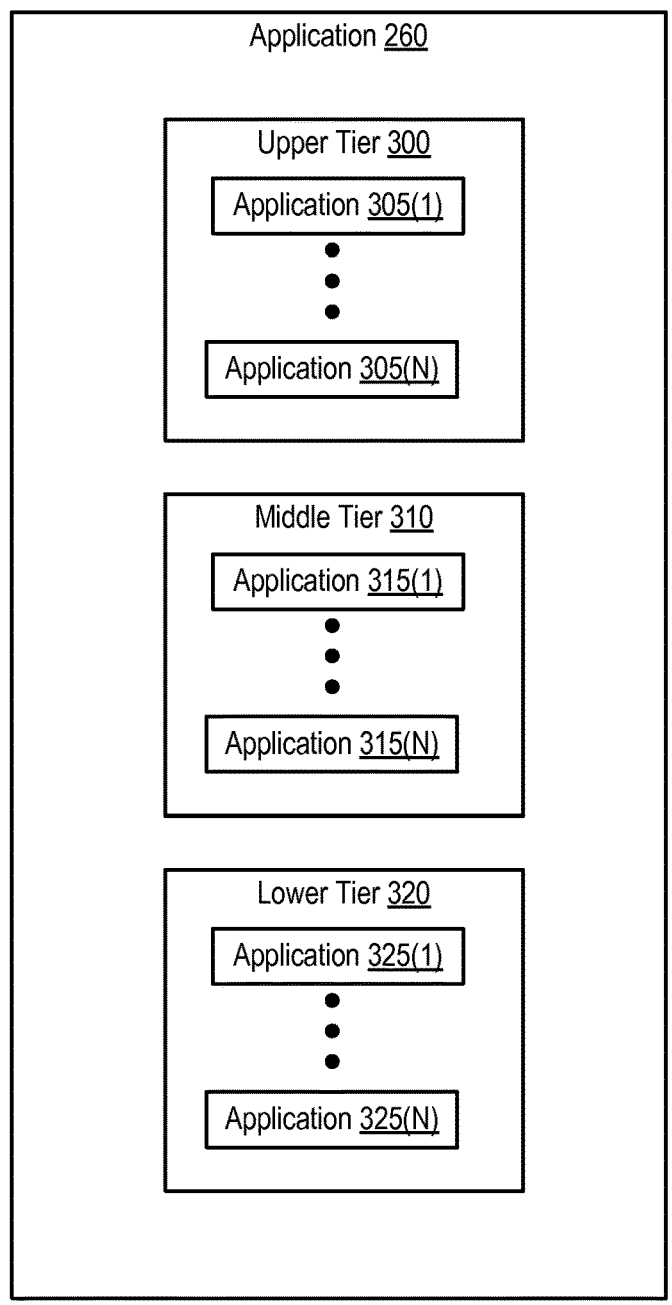
FIG. 3 is a block diagram illustrating certain components of an application, according to the present description.

FIG. 3 shows additional details regarding an application, such as application 260 of FIG. 2. Application 260 is implemented as a multi-tier application including an upper-tier 300, a middle-tier 310, and a lower-tier 320. When a DR rehearsal according to the present description is invoked for application 260, resources associated with all tiers of application 260 are included in the DR rehearsal.

Upper-tier 300 includes one or more resources, such as applications 305(1)-305(N) (collectively referred to as applications 305). Applications 305 can be any application configured to communicate with applications in middle-tier 310 and lower tier 320. Often, the upper tier of a multi-tiered application includes mechanisms with which users interact with the multi-tiered application, such as user interfaces, and the like. Upper-tier 300 also includes one or more storage elements, such as block-based storage devices included in storage 115 of FIG. 1.

Application 260 also includes middle-tier 310, which includes applications 315(1)-315(N) (collectively referred to as applications 315). Applications 315 can be any application configured to communicate with applications in upper-tier 300 and lower tier 320. Often, the middle tier of a multi-tiered application includes applications and/or logic that control the operation of the multi-tiered application, such as web server applications, data processing and transport applications, and the like. Middle-tier 310 also includes one or more storage elements, such as block-based storage devices included in storage 115 of FIG. 1.

Lower-tier 320 includes application 325(1)-325(N) (collectively referred to as applications 325). Applications 325 can be any application configured to communicate with applications in upper-tier 300 and middle tier 310. Often, the middle tier of a multi-tiered application includes data and applications configured to access the data, such as database applications, and the like. Lower-tier 320 also includes one or more storage elements, such as block-based storage devices included in storage 115 of FIG. 1.

FIG. 4A is a block diagram showing additional details of primary gateway 125 of FIG. 1. As shown, primary gateway 125 includes data receiver 405, data transmitter 410, aggregator 415 and management interface 420.

Data receiver 405 is configured to receive data, such one or more input/output commands, from one or more applications, such as applications 120, that are running in a primary site, such as primary site 110 of FIG. 1. In one embodiment, data receiver 405 determines the source of the data. For example, data receiver can determine which application of applications 120 transmitted the data. In one embodiment, data receiver 405 receives asynchronous updates from some or all of applications 120. In another embodiment, data receiver 405 queries applications 120 to determine if updates are needed, or accesses a log maintained by one or more of applications 120. Data receiver 405 can query applications on a periodic basis and/or in response to determining that some threshold has been reached or criteria met.

Aggregator 410 is configured to aggregate the data after the data is received from applications, such as applications 120 of FIG. 1. In one embodiment, aggregator 410 deduplicates and/or compresses the data. In one embodiment, aggregator 410 determines that updates to particular applications or storage locations should be stalled and prevents transmission of such updates to the recovery site. Aggregator 410, in one embodiment, sorts the data according to the source and/or destination of the data. For example, aggregator 410 can determine that updates to a particular database should be collected and stored together, regardless of the application that generated the updates.

Data transmitter 415 is configured to transmit the data from a primary site, such as primary site 110 of FIG. 1, to a recovery site, such as recovery site 170 of FIG. 1. In one embodiment, transmitting the data includes formatting the data for transmission. The data can be broken into packets or other units suitable for transmission and formatted. Data transmitter 415 can also encrypt the data prior to transmission.

Management interface 420 is configured to communicate with a resiliency manager, such as resiliency manager 140 of FIG. 1. In one embodiment, management interface 420 receives instructions from the resiliency manager to configure and control operations of the various elements of primary site 110, particularly as regards DR and DR rehearsals. For example, management interface 420 can receive messages that include instructions from resiliency manager 140 indicating that one of applications 120 should be quiesced in preparation for a DR rehearsal operations. Management interface 420 is also configured, in some embodiments, generate and transmit messages that include information notifying the resiliency manager of the status of such operations.

Figure 4B:
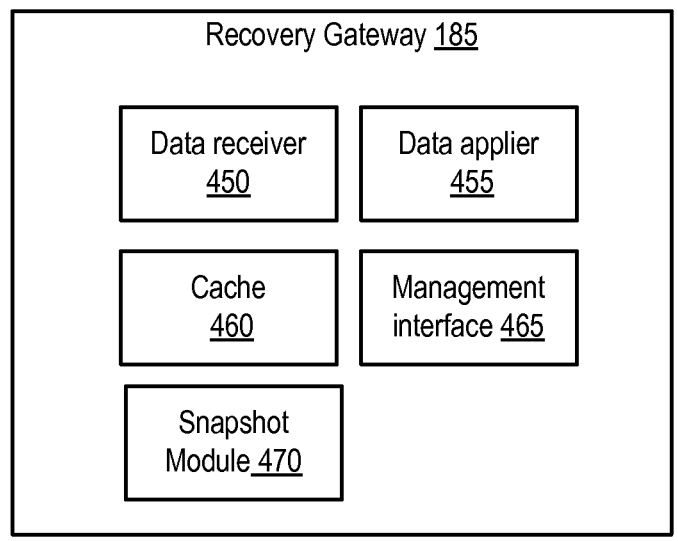
FIG. 4B is a block diagram illustrating certain components of an example computing environment, according to the present description.

FIG. 4B is a block diagram showing additional details of recovery gateway 185 of FIG. 1. Recovery gateway 185 is located in the recovery site, such as recovery site 170 of FIG. 1. Recovery gateway 185 includes data receiver 450, data applier 455, a cache 460, a management interface 465, and a snapshot module 470.

Data receiver 450 is configured to receive data, such as I/O updates and configuration information from a primary gateway in a primary site, such as primary gateway 125 of primary site 110 as shown in FIG. 1. Receiving the data involves, in one embodiment, decrypting and/or decompressing the data. Data applier 455 is configured to apply the updates to one or more data storage elements located in the recovery site. In one embodiment, this involves determining a file, application, and/or volume with which the data is associated, and determining the appropriate location to store the data in a data storage device, such as a volume in storage 175 of FIG. 1.

Cache 460 is configured to temporarily store received data prior to the received data being applied to storage. Cache 460 can be used when data is received faster than the applier can apply, or to store updates received when data applier 455 is stalled, or otherwise prevented from applying data, as in the case when a snapshot is being taken.

Management interface 465 is configured to receive instructions from a resiliency manager, such as resiliency manager 140 of FIG. 1. For example, management interface 465 can receive an instruction from the resiliency manager indicating that the updating of data in one or more volumes should be paused, also referred to as being frozen, or stalled. Management interface 465 is configured to generate and transmit to the resiliency manager one or more messages that include information notifying the resiliency manager when the updating has been paused. Management interface 465 is also configured to receive instructions from the resiliency manager indicating that a snapshot should be taken of one or more volumes, or other storage resources, associated with one or more applications. In response to determining that a snapshot has been created, management interface 465 is configured to generate and transmit to the resiliency manager one or more messages that include information notify the resiliency manager that the snapshot has been created. Management interface 465 is also configured to receive messages including instructions indicating that updating the volumes can be resumed, for example, in response to the resiliency manager detecting that a snapshot of the volumes has been created. Snapshot module 470 is configured to create a snapshot of one or more data storage resources, such as volumes. In one embodiment, snapshot module 470 creates copy on write snapshots.

FIG. 5 is a block diagram that shows additional details of an example recovery site, such as recovery site 170 of FIG. 1. Recovery site 170 is configured to recover one or more applications as part of a DR operation or DR rehearsal. Recovery site 170 can be implemented in a cloud computing environment, shown in FIG. 5 as cloud 150. Recovery site 170 includes one or more physical machines 505(1) through 505(N), referred to collectively as physical machines 505. Physical machines 505 are comparable to physical machine 200 of FIG. 2, and a more detailed description of the characteristics of physical machines 505 is omitted for the sake of brevity. Each of physical machines 505 can include one or more virtual machines 515. Recovery site 170 also includes recovery gateway 185, as described with regard to FIG. 4B, and storage 175.

Storage 175 can be included in whole or in part in one or more physical machines, such as one of physical machines 505 and/or can be coupled to one or more physical machines via a LAN or other communications media. Storage 175 includes volumes 522(1)-522(N), collectively referred to as volumes 522. These volumes store data used to implement applications, such as applications 180 of FIG. 1. Storage 175 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Storage 175 is configured to store data, such as file data 524. File data 524 is configured to be accessed by applications 180. File data 524 represents one or more of any logical or physical unit of data, such as a file system, a file, a database, a volume, a block, an extent, a disk drive, or the like.

Recovery site 170 also includes a storage configuration component (not shown) that can implemented as one or more software modules or applications configured to be used by a storage administrator to manage storage 175. Managing a storage system involves, for example: creating logical groupings, such as volumes, virtual drives, shared storage spaces, and the like; setting permissions; controlling access; organizing data; and monitoring and reporting on the health, utilization, and availability of the storage devices included in the storage system. The storage configuration component is also configured to store information regarding the storage systems managed by storage configuration component. Such information typically includes, for example, information regarding the configuration, capabilities, and utilization of the storage systems, and the storage devices therein.

Recovery site 170 also includes network assets (not shown) such as physical networking assets, such as switches, bridges, DNS servers, gateways, and network interface cards, and/or virtual networking assets such as virtual switches, virtual machine port groups, and the like. The network assets include the hardware and software elements that determine how elements of a site, such as physical machines 505, communicate with each other, and how the site communicates with the outside world, such as other sites. A network configuration component (not shown) can be implemented as one or more software modules or applications configured to be used by a network administrator to set up and monitor the site's network assets, and stores network configuration information specifying the network assets configured for the site.

Recovery site 170 also includes replication assets (not shown) that include software and/or hardware elements used to transfer data, such as file data 524, from one element of recovery site 170 to another, or from one site to one or more other sites. Replication is performed using recovery gateway 185. Recovery gateway 185 can be implemented as one or more software modules or applications. Recovery gateway 185 stores information identifying replication assets associated with each application for which replication is enabled. For example, recovery gateway 185 can include information identifying one or more replicated volumes, replication consistency groups, replication hardware, replication array credentials, replication modes, replication schedules, and the like.

FIG. 6 is a block diagram showing additional details of resiliency manager 140 of FIG. 1. Resiliency manager 140 can be implemented using a computing device such as a personal computer, laptop computer, server, personal digital assistant, cell phone, or the like, and is configured to set up and manage assets at one or more sites, as well as to configure and execute DR operations and DR rehearsals. In one embodiment, resiliency manager 140 includes a user interface (not shown). Via the user interface, a user can configure, monitor, and control DR operations and DR rehearsals in multiple sites in various geographic regions.

Resiliency manager 140 includes workflow module 610, configuration module 620, and rehearsal module 630. Configuration module 620 selects one or more applications to be configured for disaster recovery. For example, configuration module 620 can detect user input indicating that one or more specific applications should be DR enabled. In one embodiment, configuration module 620 selects all applications present in a primary site, such as primary site 110 of FIG. 1 to be DR enabled or selects a subset (less than all applications) to be DR enabled based on one or more selection criteria, such as type of application, or the like.

Workflow module 610 generates a sequence of steps involved in performing DR operations and DR rehearsals. In the case of a DR rehearsal, workflow module 620 can configure a generic workflow in advance of initiation of a DR rehearsal. The generic workflow includes a series of steps, but does not include some or all of the inputs, or assets, to which the steps apply. These inputs are determined and supplied in response to initiation of the DR rehearsal. In some embodiments, workflow module 610 does not generate a workflow for a DR rehearsal until after initiation of the DR rehearsal.

Rehearsal module 630 generates additional steps involved in performing a rehearsal of a DR operation. In one embodiment, generating workflows for DR operations and DR rehearsal operations involves accessing DR configuration data stored by configuration module 620. Workflow module 610 and rehearsal module 630 can automatically generate workflows, or run books, using this configuration information without soliciting user input from various administrators. For example, in response to a DR rehearsal being initiated or scheduled for a particular application, rehearsal module 630 performs a series of queries to determine assets associated with the application. For each asset, rehearsal module 630 determines one or more operations involved in performing a DR rehearsal using the asset. The assets and operations are transmitted to workflow module 610, which generates a DR rehearsal workflow.

Figure 7:
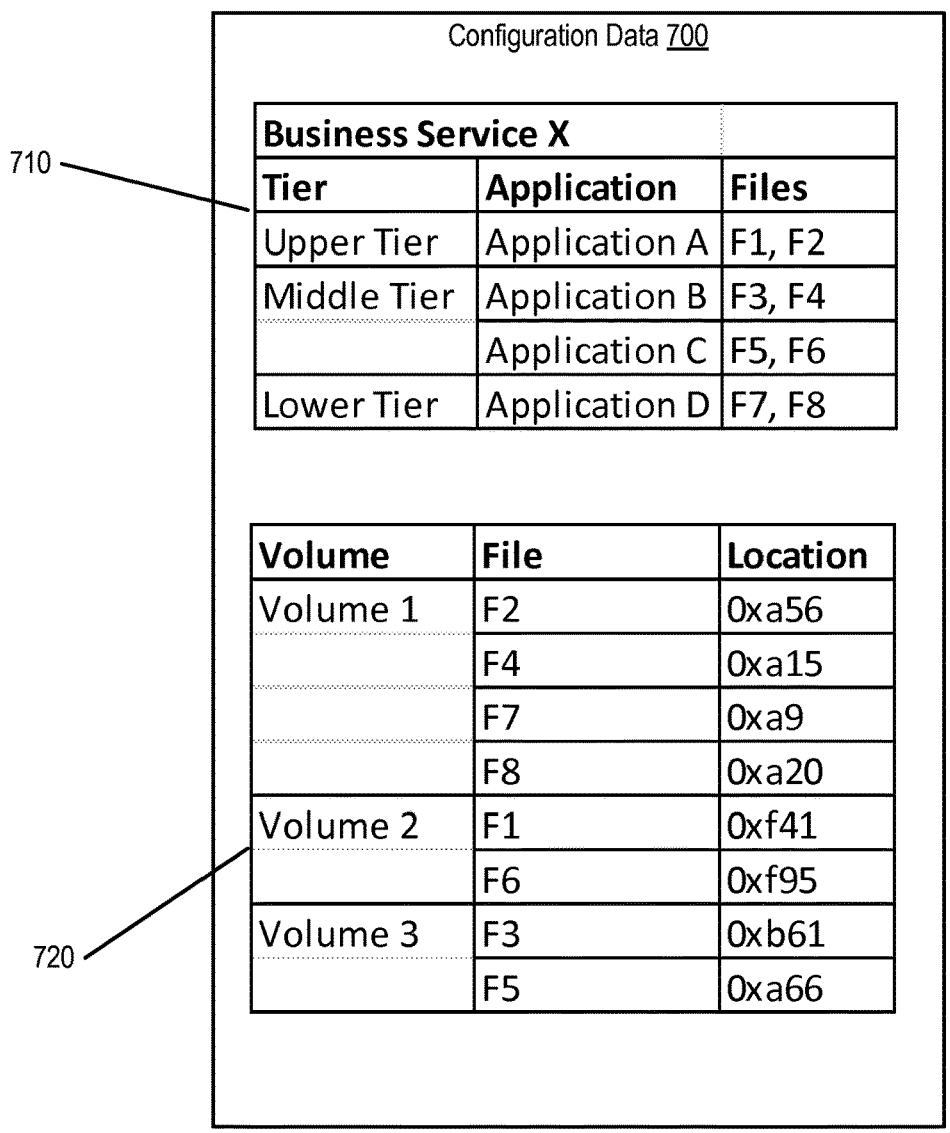
FIG. 7 is table that stores configuration data, according to the present description.

FIG. 7 shows configuration data 700. Configuration data 700 is collected and maintained, in one embodiment, by a resiliency manager, such as resiliency manager 140 of FIG. 1. Configuration data 700 can be used to determine which assets, such as applications and their data, are involved in performing DR and DR rehearsals for a particular application. In one embodiment, a resiliency manager collects and stores such configuration information for each application provided by a site.

In the example shown in FIG. 7, configuration data 700 includes, at 710, information about a multi-tier application Business Service X. For each tier of the multi-tiered application, including, for example, an upper-tier, middle-tier, and lower-tier, the information at 710 includes which applications are associated with the tiers and which files are associated with those applications. For example, an upper-tier associated with Business Service X can include an Application A. This application can be, for example, a virtual machine that uses files F1 and F2.

Configuration data 700 includes, at 720, information regarding locations of the resources used by the multi-tiered application. For example, multi-tiered application Business Service X includes files F1-F8. Each of those files is stored in a volume in one or more storage devices, such as storage 115 of primary site 110 of FIG. 1. The files are distributed among those volumes, and the address locations at which the files can be accessed are shown in information 720. In response to a DR rehearsal being initiated, updates to the locations indicated in 720 can be stalled, or frozen, while a snapshot is created of those locations.

Figure 8:
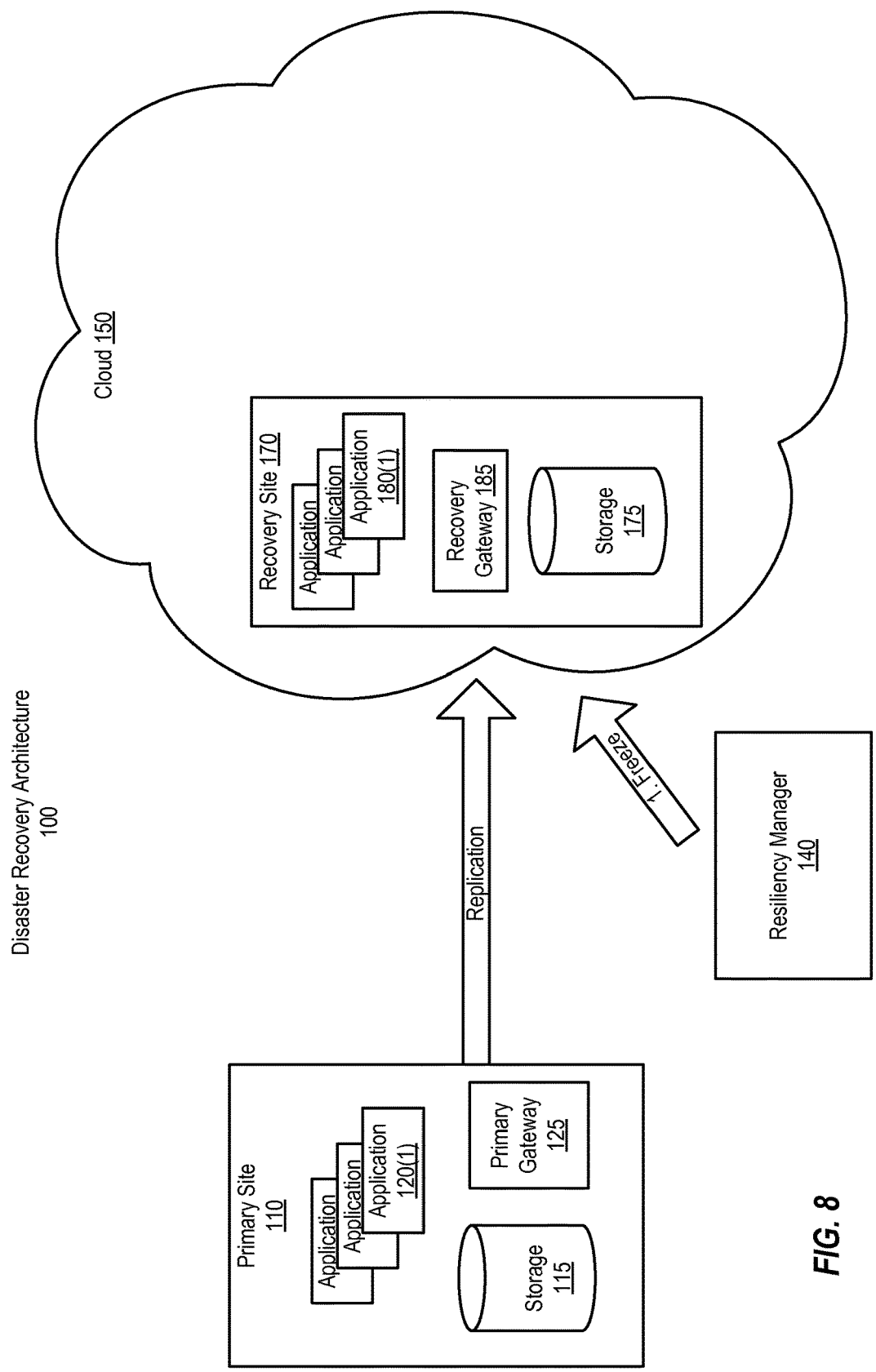
FIG. 8 is a block diagram illustrating certain components of an example computing environment, according to the present description.

FIG. 8 is a block diagram showing disaster recovery architecture 100. In operation, primary gateway 125 replicates data from primary site 110 to recovery site 170. Specifically, primary gateway 125 transmits data, such as I/O updates, to recovery gateway 185. While this replication is ongoing, resiliency manager 140 sends an instruction to recovery gateway 185 to freeze application of replicated changes. That is, prior to receipt of the freeze instruction, the updates that are replicated from primary gateway 125 to recovery gateway 185 are applied by recovery gateway 185 to storage 175. After the freeze instructions, updates are still replicated from primary site 110 to recovery site 170, but the updates are not applied to storage 175. This prevents the DR rehearsal from adversely affecting continuing access to primary site 110. Resiliency manager 140 transmits an instruction data that indicates that the updates should be stalled. In one embodiment, recovery gateway 185 redirects the updates to a cache. In another embodiment, recovery gateway 185 temporarily detaches, or unmounts one or more volumes in storage 175. In one embodiment, recovery gateway 185 stores a list of I/O operations that have been received, e.g., in a log. Alternatively, resiliency manager 140 can access a log maintained at the primary site, e.g., by an application or by the primary gateway. Recovery gateway 185 can use the log to apply the stalled updates after recovery gateway receives a resume instruction.

Resiliency manager 140 sends the freeze instruction in response to determining that a disaster rehearsal will be performed for a particular application or set of applications. For example, the freeze instruction can indicate that all I/O operations for a particular application should be frozen. Recovery gateway 185, in one embodiment, determines, if the application is a multi-tier application, which applications are associated with the multi-tier application and for each tier, stalls, or pauses I/O operations directed to the set of applications associated with the tier, e.g., by redirecting those I/O operations to a cache.

Figure 9:
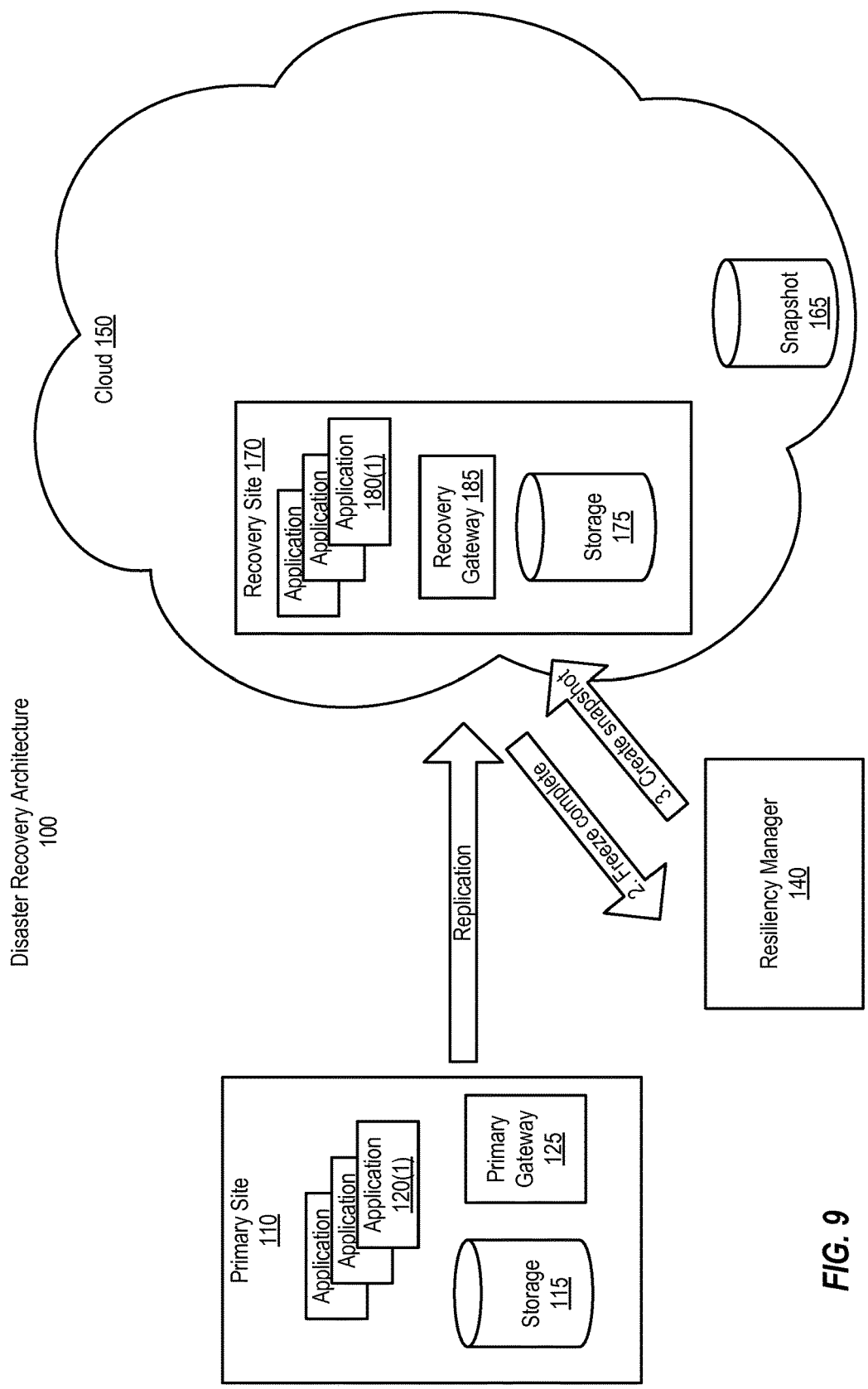
FIG. 9 is a block diagram illustrating certain components of an example computing environment, according to the present description.

At FIG. 9, while replication is ongoing from primary site 110 to recovery site 170, recovery gateway 185 notifies resiliency manager 140 that the freeze is complete. That is, in response to receiving an instruction that updates directed to a specific multi-tier application should be paused, recovery gateway 185 notifies the resiliency manager that those updates are being paused, or redirected to a cache. In response to receiving the notice from recovery gateway 185 that the freeze is complete, resiliency manager 140 instructs recovery gateway 185 to create a snapshot of the storage elements, such as volumes, associated with the multi-tier application. FIG. 9 shows, at 165, a snapshot of the those volumes.

Figure 10:
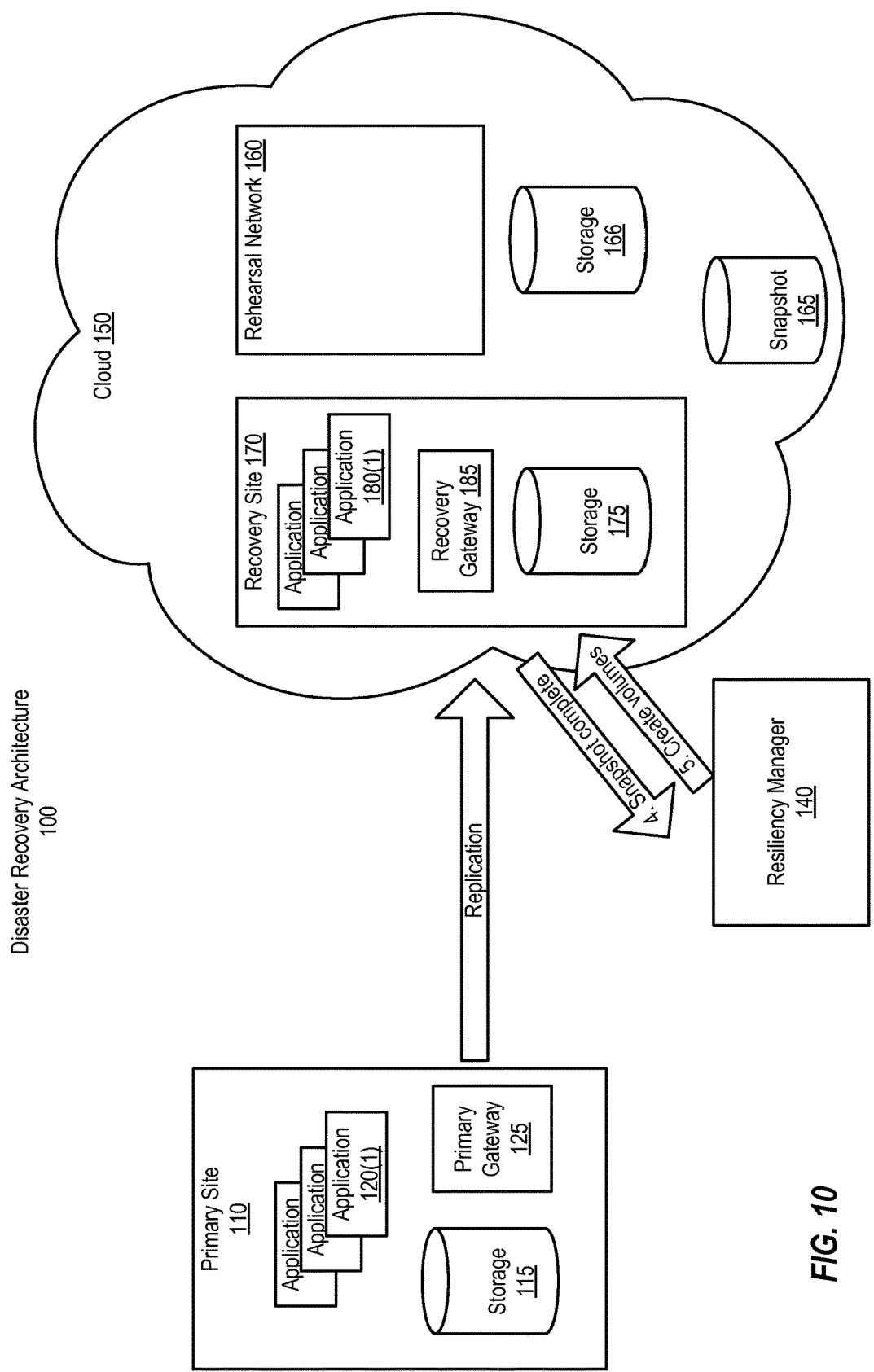
FIG. 10 is a block diagram illustrating certain components of an example computing environment, according to the present description.

FIG. 10 shows that a recovery gateway 185, in response to creating snapshot 165, notifies resiliency manager 140 that the snapshot has been created. In response to being notified that the snapshot has been created, resiliency manager 140 instructs recovery gateway 185 to unfreeze updates that were previously frozen and to create, using snapshot 165, one or more volumes in which an instance of the multi-tiered application will be started. Using snapshot 165 the recovery gateway creates the volumes. The volumes created using snapshot 165 are shown as storage 166.

Figure 11:
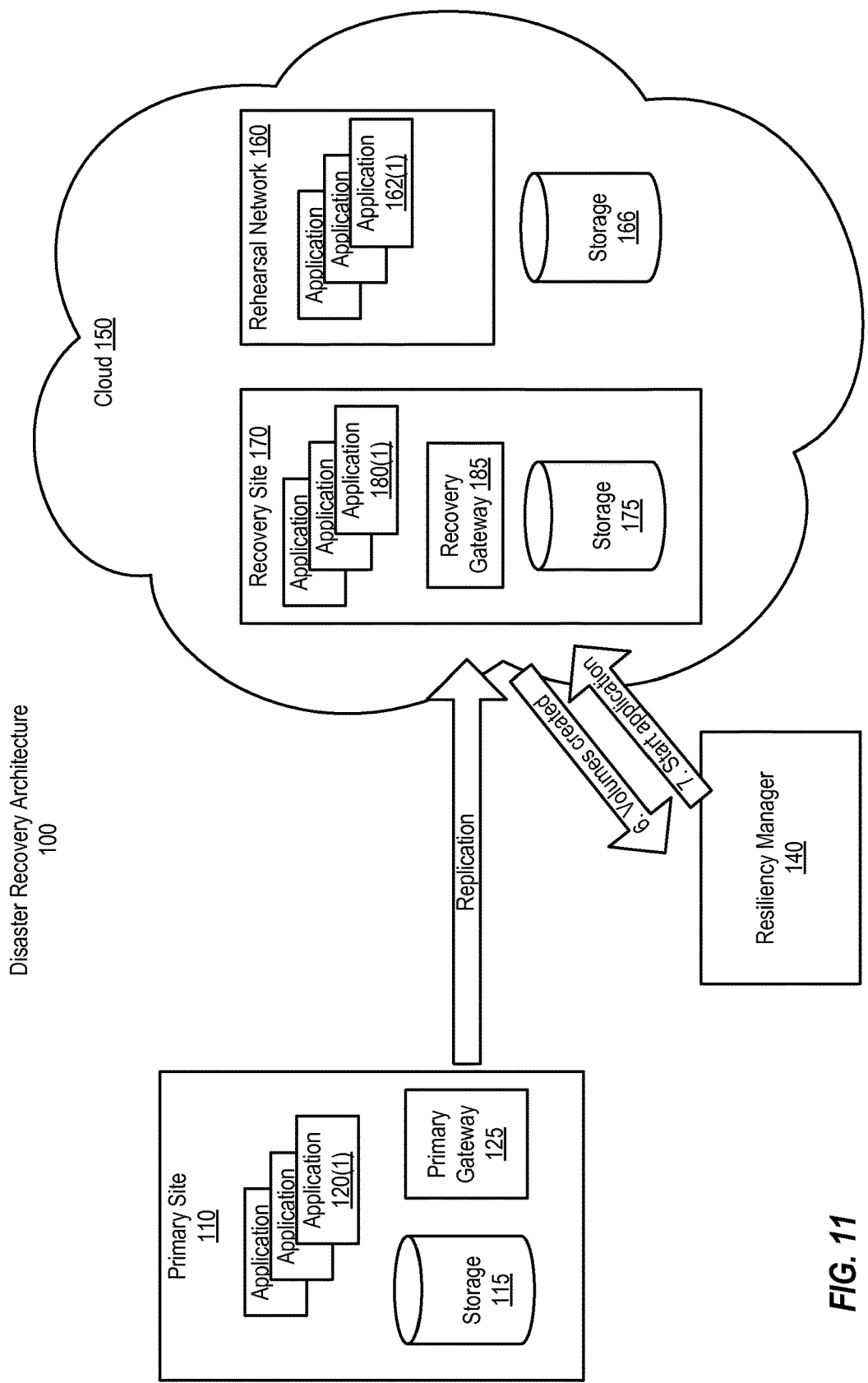
FIG. 11 is a block diagram illustrating certain components of an example computing environment, according to the present description.

At FIG. 11, recovery gateway 185 notifies resiliency manager 140 that the volumes have been created. In response to receiving notification that the volumes have been created, resiliency manager 140 instructs recovery gateway 185 to start, in rehearsal network 160, the multi-tiered application for which disaster recovery is being performed using the volumes. Rehearsal network 160 is an isolated network compared to recovery site 170. The multi-tiered application is shown as having been started as application 162. Further testing to determine whether application 162 satisfies the criteria for a successful DR operation can be performed at this point.

The operations depicted in FIGS. 8-11 refer primarily to a crash-consistent DR rehearsal. The present disclosure is also well-suited to perform an alternative embodiment known as application-consistent DR rehearsal. In an application consistent DR rehearsal, the resiliency manager would send a stall instruction to the multi-tiered application. The multi-tiered application is configured to complete any ongoing transactional operations, which can include multiple I/O and/or command operations, and then signal that the multi-tiered application is quiesced. In response to detecting the multi-tiered application is quiesced, the primary gateway is configured to insert a marker into its replication stream. After the primary gateway has detected that the multi-tiered application is quiesced, the resiliency manager instructs the multi-tiered application to resume operations. The resiliency manager sends a message to the recovery gateway instructing the recovery gateway to stall updates associated with the multi-tiered application, but the recovery gateway waits until the recovery gateway detects the marker in the replication stream received from the primary gateway before doing so. While the application-consistent DR rehearsal has a slight impact on the production site, recovery is often more expedient, as compared to the crash-consistent DR rehearsal, because there are no stalled updates to replay and no recovery logs to query. Also, the rehearsal uses consistent data.

With crash-consistent DR rehearsal, the state of the recovery storage is captured at the time the stall instruction is received by the recovery gateway. A snapshot taken immediately after the stall is performed does not capture the contents of any pending I/O operations. If a crash-consistent snapshot were used to instantiate an application, the application would be in the same state it would have been if the application crashed at the time the stall instruction was completed. Recovery using a crash-consistent snapshot may involve and replaying updates stored in log files.

Application-consistent DR rehearsal involves the multi-tiered application flushing all of its updates so that the multi-tiered application is in a consistent state. This effectively places the multi-tiered application the same state it would be if the multi-tiered application were properly closed. The DR rehearsal instance of the multi-tiered application can begin operation without maintaining and replaying transaction logs.

Figure 12:
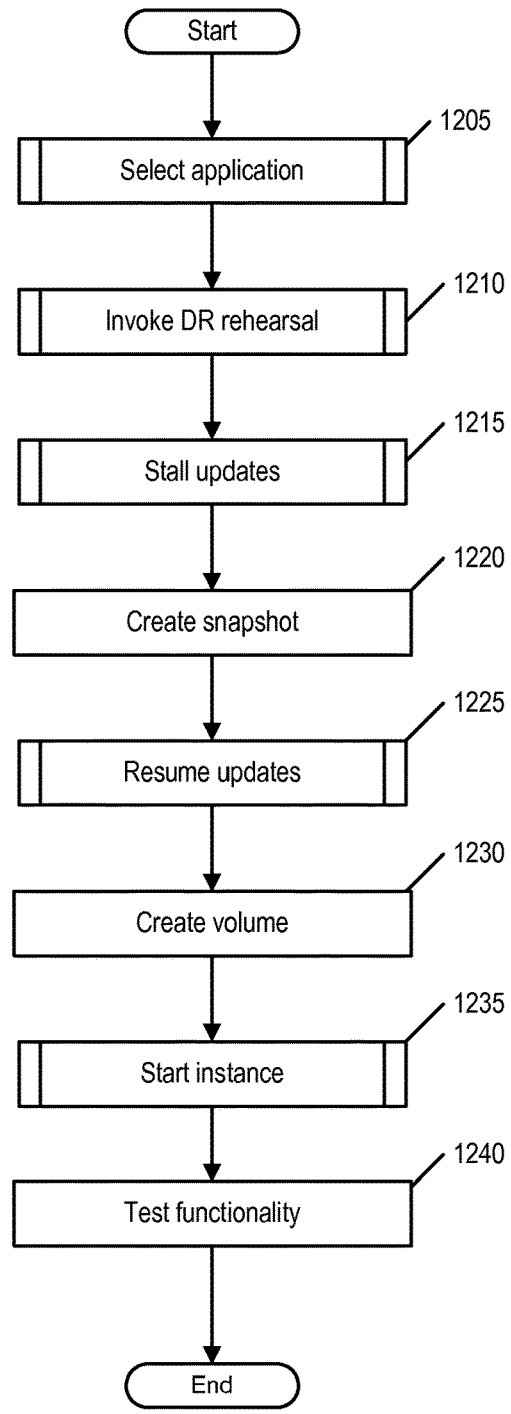
FIG. 12 is a flowchart illustrating an example process, according to the present description.

FIG. 12 is a flowchart showing a method for performing a Disaster Recovery Rehearsal (DR rehearsal). At 1205, an application is selected. In one embodiment, the application is selected by a resiliency manager, such as resiliency manager 140 of FIG. 1. The resiliency manager selects the application in response to determining that a disaster recovery rehearsal should be performed for the application. In one embodiment, resiliency manager detects a DR rehearsal criteria, such as the expiration of a period of time since a previous DR rehearsal. In another embodiment, the resiliency manager receives user input indicating that the application should have its disaster recovery capabilities rehearsed. Other events or conditions can occur or exist that cause the resiliency manager to automatically select the application for rehearsal. In one embodiment, the application is a multi-tier application. Additional details of selection an application are described with regard to FIG. 13.

At 1210, the resiliency manager invokes a DR rehearsal. Additional details of invoking a DR rehearsal are discussed with regard to FIG. 14. At 1215, the resiliency manager stalls updates associated with a selected application. In one embodiment, this involves determining each application and/or resource associated with the multi-tier application, and instructing a recovery gateway, such as recovery gateway 185 of FIG. 1, to temporarily prevent any updates from being applied to storage elements, e.g., volumes, associated with the applications. Additional details regarding stalling updates are discussed with regard to FIG. 15.

At 1220, the resiliency manager instructs a snapshot to be made of the storage resources associated with the selected multi-tier application. Though the present description refers to creation of a single snapshot, multiple snapshots can be made. For example, one snapshot can be created for each volume, application, file, or other resource associated with the multi-tiered application. At 1225, the resiliency manager instructs the recovery gateway to resume making updates to the resources associated with the selected application. Additional details regarding resuming updates are discussed with regard to FIG. 16.

The resiliency manager instructs, at 1230, the recovery gateway to create one or more storage elements, e.g., volumes, using the snapshot created at 1220. In one embodiment, the snapshot data is used to create one or more volumes having corresponding structure to those stored in the recovery site, shown in storage 175 of FIG. 1, and configured to be used for disaster recovery. The volumes are created, in one embodiment, in a cloud computing environment that includes the recovery site. In one embodiment, the data in the snapshot includes all data needed instantiate the application in the rehearsal network.

At 1240, the resiliency manager instructs the recovery gateway to instantiate the application in the volumes in the rehearsal network. In one embodiment, the rehearsal network represents an isolated network, such that there is no confusion between the applications in the rehearsal network and the applications in the recovery site. Additional details regarding starting the instance of the application are discussed with regard to FIG. 17.

At 1245, the resiliency manager can indicate that one or more tests of the application instantiated in the rehearsal network be performed. In one embodiment, the operations performed by the resiliency manager are implemented as a workflow, e.g., a workflow implemented using workflow module 610 of FIG. 6.

Figure 13:
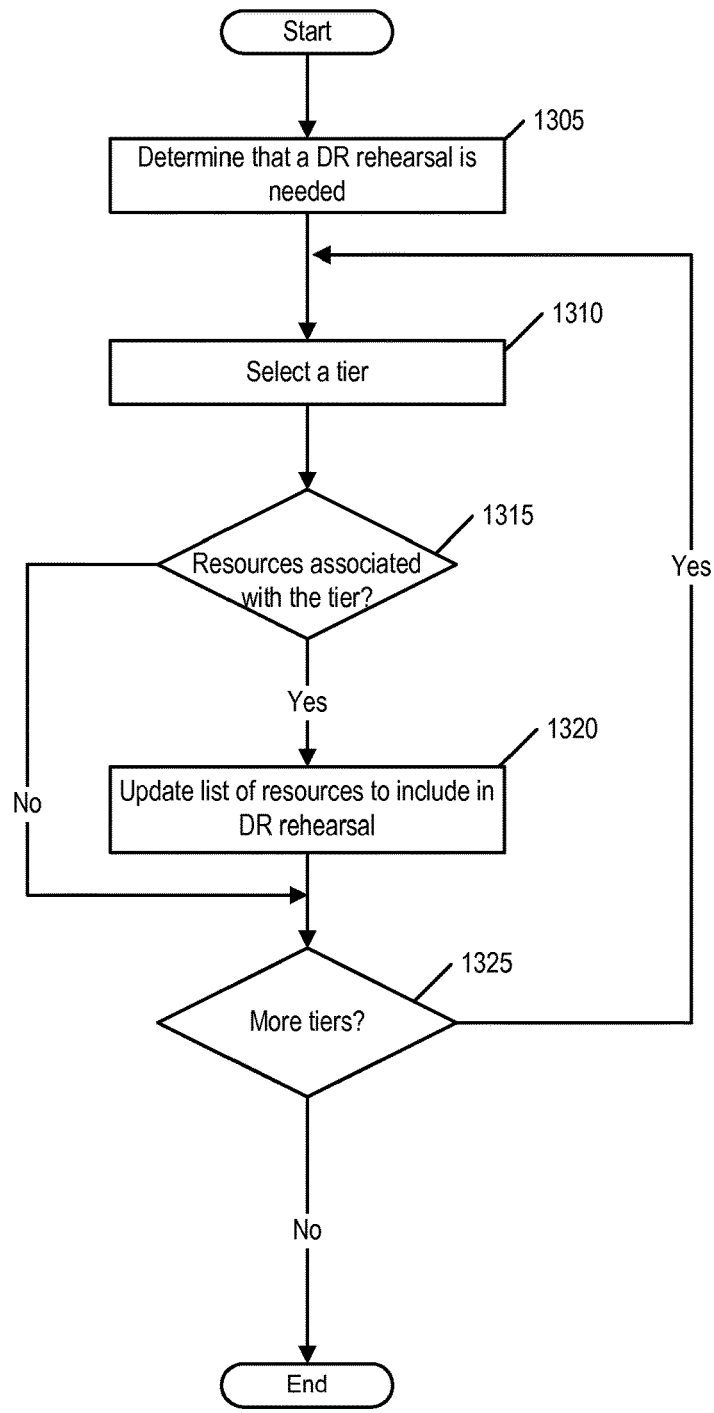
FIG. 13 is a flowchart illustrating an example process, according to the present description.

FIG. 13 is a flowchart showing additional details of selecting an application. In one embodiment, the method of FIG. 13 is performed by a resiliency manager, such as resiliency manager 140 of FIG. 1. At 1305, the resiliency manager determines that a DR rehearsal is needed. The resiliency manager can determine that DR rehearsal is needed in response to automatic detection that a criteria or threshold has been reached or satisfied, or in response to manual input from a user. In one embodiment, the determination that a DR rehearsal is needed applies to a multi-tier application.

At 1310, the resiliency manager selects a first-tier of the multi-tier application. At 1315, the resiliency manager determines what resources are associated with the tier. For example, one or more applications, volumes, files, virtual machines on which one or more applications are implemented, virtual machine files, and the like can be associated with a tier of a multi-tier application. In response to identifying each resource, the resiliency manager updates, at 1320, a list of resources to be included in the DR rehearsal. At 1325, the resiliency manager determines whether more tiers are associated with the multi-tier application. If so, the method returns to 1310.

Figure 14:
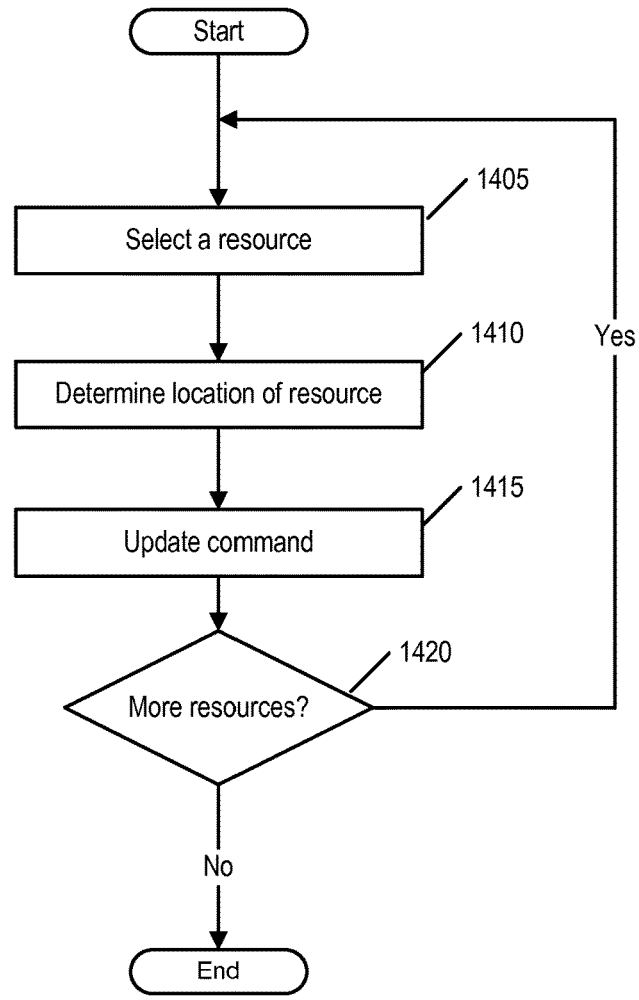
FIG. 14 is a flowchart illustrating an example process, according to the present description.

FIG. 14 is a flowchart showing additional details of invoking a DR rehearsal. In one embodiment, the method of FIG. 14 is performed by a resiliency manager, such as resiliency manager 140 of FIG. 1. At 1405, the resiliency manager selects a resource. The resource is one that has been identified as being associated with a particular application, such a multi-tier application for which disaster recovery is being rehearsed. The resource can be, for example, an application, a virtual machine, a volume, or any other resource that is associated with a multi-tier application. In one embodiment, the resiliency manager accesses a list of resources that have been identified as being associated with the multi-tier application.

At 1410, the resiliency manager determines the location of the resource. For example, the resiliency manager determines a logical address in a volume. In one embodiment, the resource manager updates configuration information, such as location information 720 of FIG. 7.

At 1415, the resiliency manager updates a DR rehearsal command to include the address information. For example, when the DR rehearsal is initiated, the resiliency manager will send a command identifying those resources that are affected by the impending DR rehearsal, and, optionally, the address information identifying the location of those resources. At 1420, the resiliency manager determines whether more resources are affected by the DR rehearsal. If so, the method returns to 1405.

Figure 15:
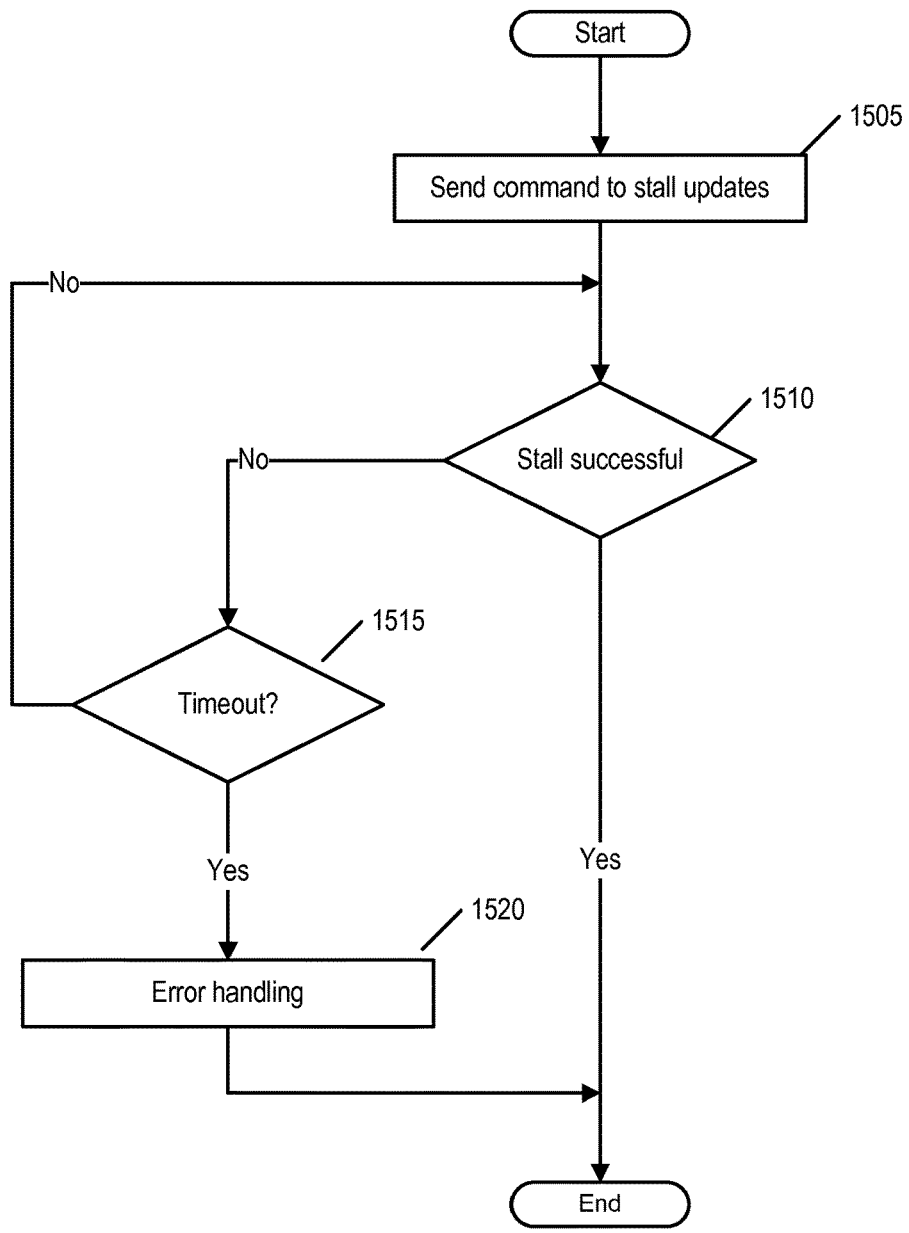
FIG. 15 is a flowchart illustrating an example process, according to the present description.

FIG. 15 is a flowchart showing additional details of stalling updates to a storage device. In one embodiment, the method shown in FIG. 15 is performed by a resiliency manager, such as resiliency manager 140 of FIG. 1. At 1505, the resiliency manager sends a command to stall updates. In one embodiment, a command includes information that identifies one or more resources associated with an application, such as a multi-tier application. At 1510, the resiliency manager determines whether the stall command was successfully executed at a recovery site, such as recovery site 170 of FIG. 1. In one embodiment, the resiliency manager determines whether the resiliency manager has received a message from a recovery site indicating that the stall was successful. If not, the resiliency manager waits, at 515, until a predefined interval of time has expired. If a resiliency manager determines, at 1515, that the predetermined amount of time has not expired, the method returns to 1510, and the resiliency manager checks to see whether the stall has been successful. If not, and the predefined period of time expires, then the resiliency manager performs one or more operations associated with error handling. In one embodiment, error handling can involve canceling the disaster recovery rehearsal operation and generating an error notification, which is transmitted to a user. In another embodiment, error handling involves restarting the disaster recovery rehearsal, for example, by retransmitting the stall command.

Figure 16:
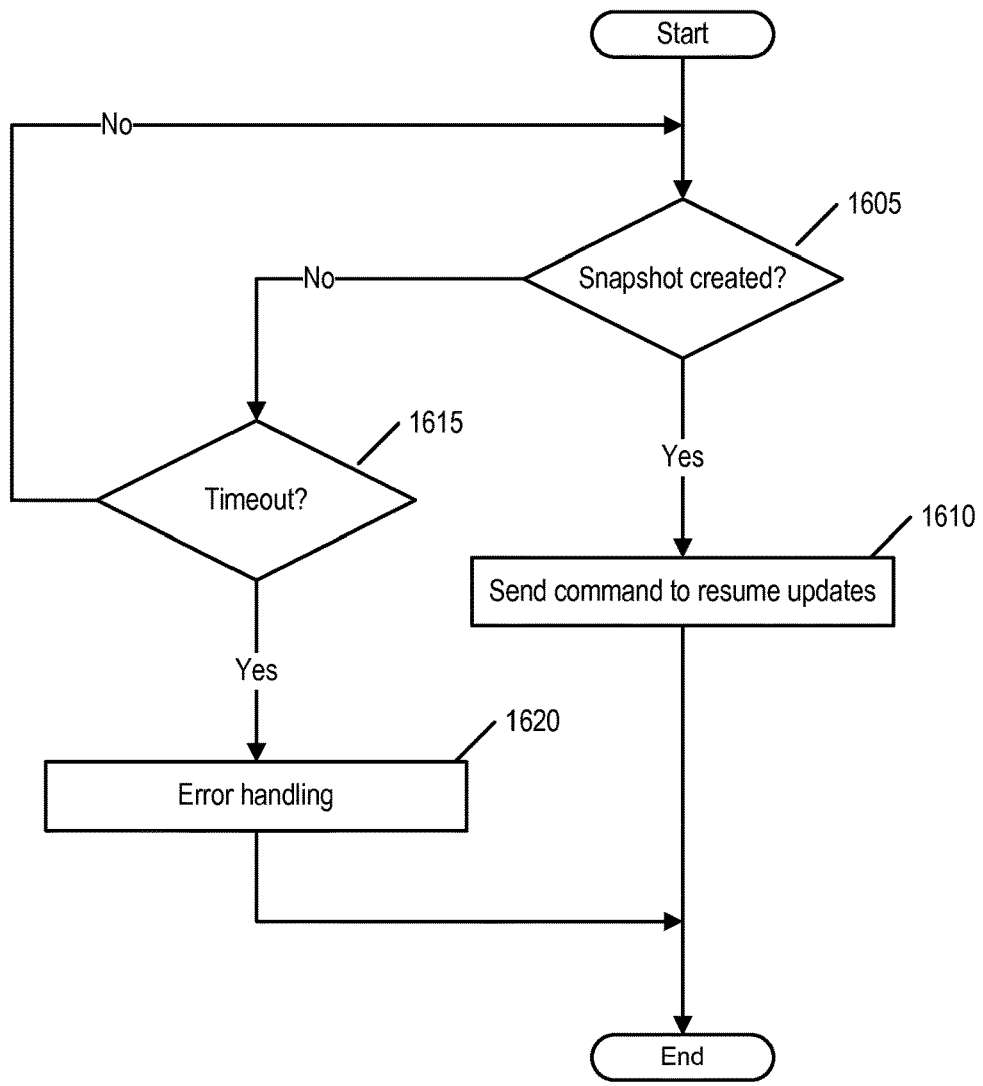
FIG. 16 is a flowchart illustrating an example process, according to the present description.

FIG. 16 is a flowchart illustrating additional details of resuming updates. The method of FIG. 16 is performed, in one embodiment, by a resiliency manager, such as resiliency manager 140 of FIG. 1. At 1605, the resiliency manager determines whether a snapshot has been successfully created. In one embodiment, this involves determining whether a message has been received, for example, from a recovery site, such as recovery site 170 of FIG. 1, indicating that a snapshot was created. If not, the resiliency manager waits. In one embodiment, the resiliency manager waits a pre-specified amount of time. If the pre-specified amount of time expires, the resiliency manager can take error handling actions, such as cancelling the disaster recovery rehearsal and generating and displaying an error indication, or restarting the disaster recovery rehearsal. In response to determining that the snapshot has been created, the resiliency manager sends a command to resume updates at 1610. In one embodiment, this involves transmitting to a recovery gateway, such as recovery gateway 185, of the recovery site, an instruction. The instruction can specify that any updates that have been cached should be processed, and once all cached updates have been processed, replicated changes can be applied to the storage.

Figure 17:
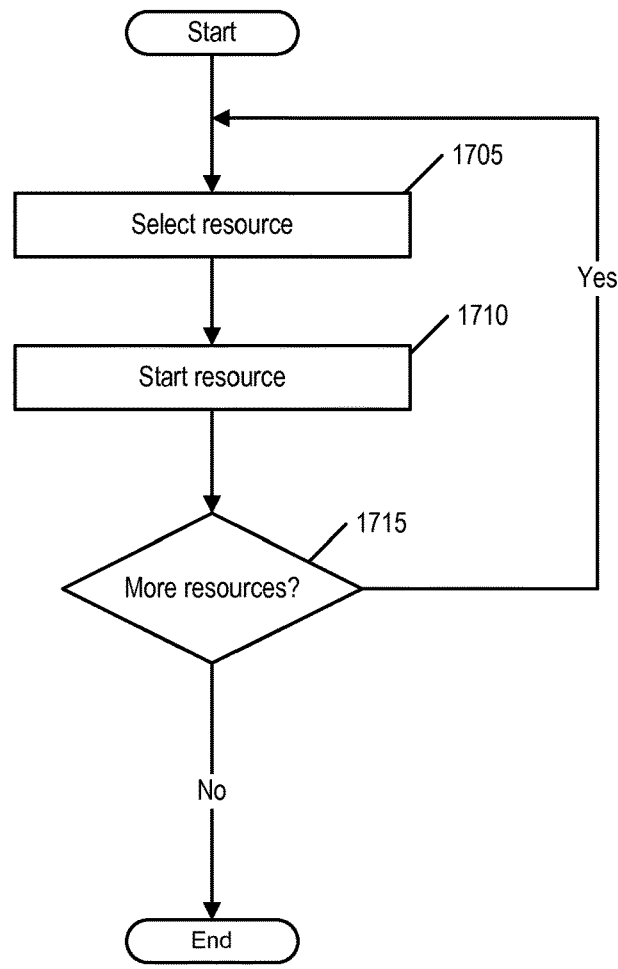
FIG. 17 is a flowchart illustrating an example process, according to the present description.

FIG. 17 is a flowchart illustrating additional details of starting an instance of an application. In one embodiment, the method of FIG. 17 is performed by a resiliency manager, such as resiliency manager 140 of FIG. 1. At 1705, the resiliency manager selects a resource. The resource can be a virtual machine and its associated virtual disk file, an application, or the like. At 1710, the resiliency manager starts the resource. In one embodiment, this involves booting an application, instantiating a virtual machine, and the like. At 1715, the resiliency manager determines whether there are more resources associated with a disaster recovery rehearsal that should be started. If so, the method returns to 1705.

Figure 18:
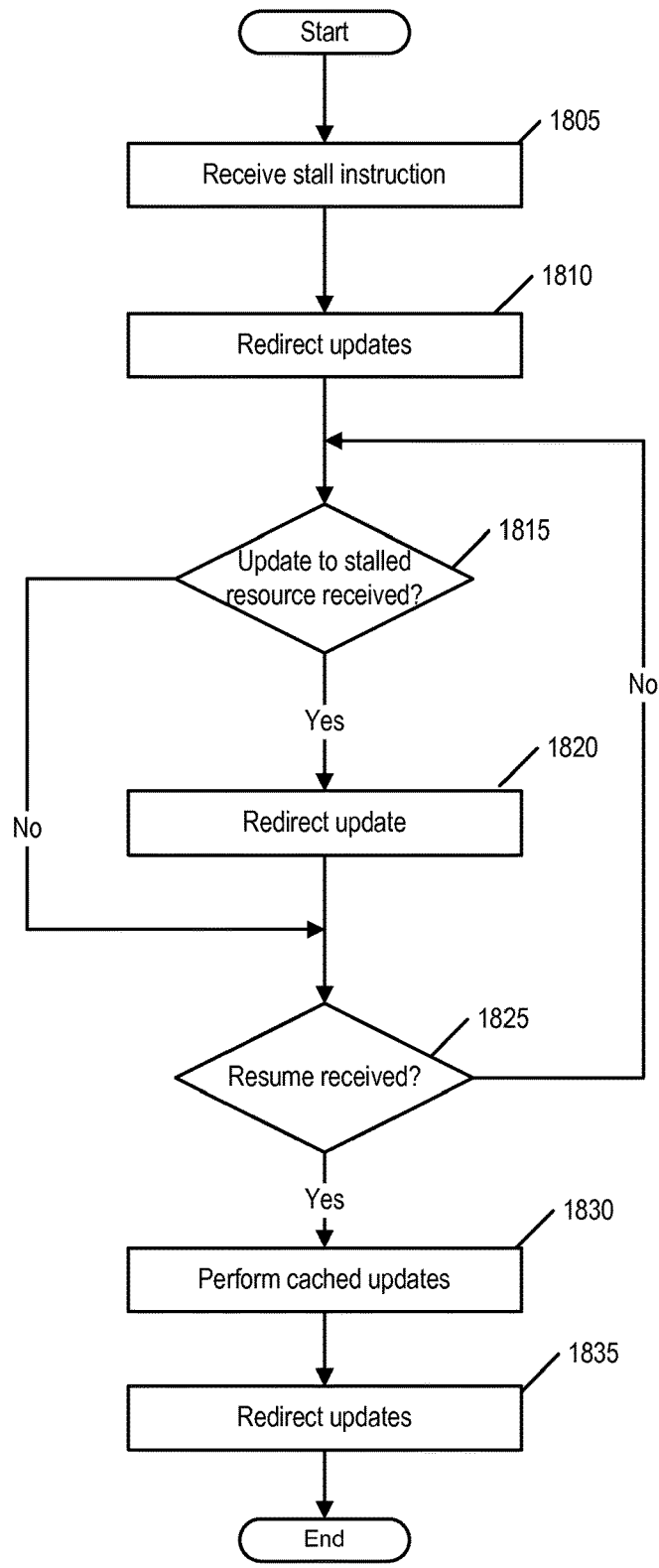
FIG. 18 is a flowchart illustrating an example process, according to the present description.

FIG. 18 is a flowchart showing additional operations performed during a DR rehearsal. In one embodiment, the method shown in FIG. 18 is performed by a recovery gateway, such as recovery gateway 185 of FIG. 1. At 1805, the recovery gateway receives a stall instruction. In one embodiment, the stall instruction is received from a resiliency manager, such as resiliency manager 140 of FIG. 1, and includes information identifying one or more applications, resources associated with the one or more applications, and/or locations at which the resources are stored.

At 1810, the recovery gateway redirects updates directed toward the resources specified by the stall instruction. For example, the recovery gateway can store the updates in a cache. In one embodiment, the recovery gateway logs the updates. Information identifying the updates can be stored in a log comprising a list of updates received while operations are paused.

At 1815, the recovery gateway determines whether any updates have been received that are directed toward resources identified in the stall instruction. If so, those updates are redirected in accordance with 1810. At 1825, the recovery gateway determines whether a resume instruction has been received, for example, from the resiliency manager. If not, the method returns to 1815 and the recovery gateway determines whether any additional updates have been received.

In response to receiving a resume instruction, the recovery gateway performs the cached updates. At 1835, the recovery gateway redirects the updates. For example, the recovery gateway updates its procedures such that updates received towards the resources identified in the stall instruction will no longer be cached, but will instead be applied.

An Example Computing Environment

Figure 19:
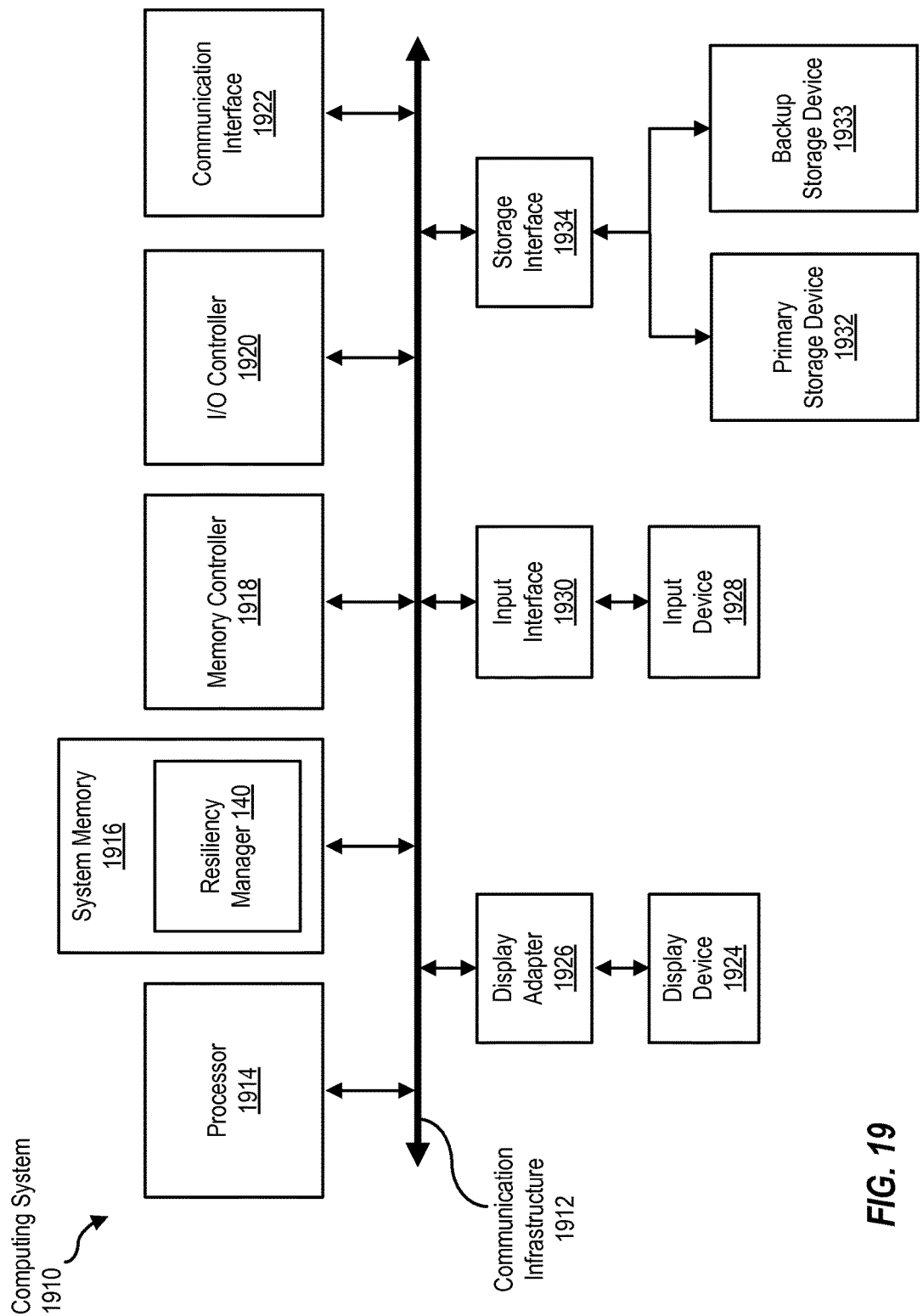
FIG. 19 is a block diagram of a computing system, according to the present description.

FIG. 19 is a block diagram of a computing system 1910 that includes resiliency manager 140 for performing DR rehearsals as described above. Computing system 1910 broadly represents any single or multi-processor computing device or system capable of executing computer-readable instructions. Examples of computing system 1910 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 1910 may include at least one processor 1914 and a system memory 1916. By executing the software that implements a rehearsal module 422, computing system 1910 becomes a special purpose computing device that is configured to perform DR rehearsals.

Processor 1914 generally represents any type or form of processing unit capable of processing data or interpreting and executing instructions. In certain embodiments, processor 1914 may receive instructions from a software application or module. These instructions may cause processor 1914 to perform the functions of one or more of the embodiments described and/or illustrated herein. For example, processor 1914 may perform and/or be a means for performing the operations described herein. Processor 1914 may also perform and/or be a means for performing any other operations, methods, or processes described and/or illustrated herein.

System memory 1916 generally represents any type or form of volatile or non-volatile storage device or medium capable of storing data and/or other computer-readable instructions. Examples of system memory 1916 include, without limitation, random access memory (RAM), read only memory (ROM), flash memory, or any other suitable memory device. Although not required, in certain embodiments computing system 1910 may include both a volatile memory unit (such as, for example, system memory 1916) and a non-volatile storage device (such as, for example, primary storage device 1932, as described in detail below). In one example, program instructions executable to implement a resiliency manager 140 (e.g., as shown in FIG. 6) may be loaded into system memory 1916.

In certain embodiments, computing system 1910 may also include one or more components or elements in addition to processor 1914 and system memory 1916. For example, as illustrated in FIG. 19, computing system 1910 may include a memory controller 1918, an Input/Output (I/O) controller 1920, and a communication interface 1922, each of which may be interconnected via a communication infrastructure 1912. Communication infrastructure 1912 generally represents any type or form of infrastructure capable of facilitating communication between one or more components of a computing device. Examples of communication infrastructure 1912 include, without limitation, a communication bus (such as an Industry Standard Architecture (ISA), Peripheral Component Interconnect (PCI), PCI express (PCIe), or similar bus) and a network.

Memory controller 1918 generally represents any type or form of device capable of handling memory or data or controlling communication between one or more components of computing system 1910. For example, in certain embodiments memory controller 1918 may control communication between processor 1914, system memory 1916, and I/O controller 1920 via communication infrastructure 1912. In certain embodiments, memory controller 1918 may perform and/or be a means for performing, either alone or in combination with other elements, one or more of the operations or features described and/or illustrated herein.

I/O controller 1920 generally represents any type or form of module capable of coordinating and/or controlling the input and output functions of a computing device. For example, in certain embodiments I/O controller 1920 may control or facilitate transfer of data between one or more elements of computing system 1910, such as processor 1914, system memory 1916, communication interface 1922, display adapter 1926, input interface 1930, and storage interface 1934.

Communication interface 1922 broadly represents any type or form of communication device or adapter capable of facilitating communication between computing system 1910 and one or more additional devices. For example, in certain embodiments communication interface 1922 may facilitate communication between computing system 1910 and a private or public network including additional computing systems. Examples of communication interface 1922 include, without limitation, a wired network interface (such as a network interface card), a wireless network interface (such as a wireless network interface card), a modem, and any other suitable interface. In at least one embodiment, communication interface 1922 may provide a direct connection to a remote server via a direct link to a network, such as the Internet. Communication interface 1922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1922 may also represent a host adapter configured to facilitate communication between computing system 1910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1922 may also allow computing system 1910 to engage in distributed or remote computing. For example, communication interface 1922 may receive instructions from a remote device or send instructions to a remote device for execution.

As illustrated in FIG. 19, computing system 1910 may also include at least one display device 1924 coupled to communication infrastructure 1912 via a display adapter 1926. Display device 1924 generally represents any type or form of device capable of visually displaying information forwarded by display adapter 1926. Similarly, display adapter 1926 generally represents any type or form of device configured to forward graphics, text, and other data from communication infrastructure 1912 (or from a frame buffer, as known in the art) for display on display device 1924.

As illustrated in FIG. 19, computing system 1910 may also include at least one input device 1928 coupled to communication infrastructure 1912 via an input interface 1930. Input device 1928 generally represents any type or form of input device capable of providing input, either computer or human generated, to computing system 1910. Examples of input device 1928 include, without limitation, a keyboard, a pointing device, a speech recognition device, or any other input device.

As illustrated in FIG. 19, computing system 1910 may also include a primary storage device 1932 and a backup storage device 1933 coupled to communication infrastructure 1912 via a storage interface 1934. Storage devices 1932 and 1933 generally represent any type or form of storage device or medium capable of storing data and/or other computer-readable instructions. For example, storage devices 1932 and 1933 may be a magnetic disk drive (e.g., a so-called hard drive), a floppy disk drive, a magnetic tape drive, an optical disk drive, a flash drive, or the like. Storage interface 1934 generally represents any type or form of interface or device for transferring data between storage devices 1932 and 1933 and other components of computing system 1910.

In certain embodiments, storage devices 1932 and 1933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1932 and 1933 may also include other similar structures or devices for allowing computer software, data, or other computer-readable instructions to be loaded into computing system 1910. For example, storage devices 1932 and 1933 may be configured to read and write software, data, or other computer-readable information. Storage devices 1932 and 1933 may also be a part of computing system 1910 or may be a separate device accessed through other interface systems.

Many other devices or subsystems may be connected to computing system 1910. Conversely, all of the components and devices illustrated in FIG. 19 need not be present to practice the embodiments described and/or illustrated herein. The devices and subsystems referenced above may also be interconnected in different ways from that shown in FIG. 19.

Computing system 1910 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1910 for storage in memory via a network such as the Internet or upon a carrier medium.

The non-transitory computer-readable medium containing the computer program may be loaded into computing system 1910. All or a portion of the computer program stored on the non-transitory computer-readable medium may then be stored in system memory 1916 and/or various portions of storage devices 1932 and 1933. When executed by processor 1914, a computer program loaded into computing system 1910 may cause processor 1914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1910 may be configured as an application specific integrated circuit (ASIC) adapted to implement one or more of the embodiments disclosed herein.

An Example Networking Environment

Figure 20:
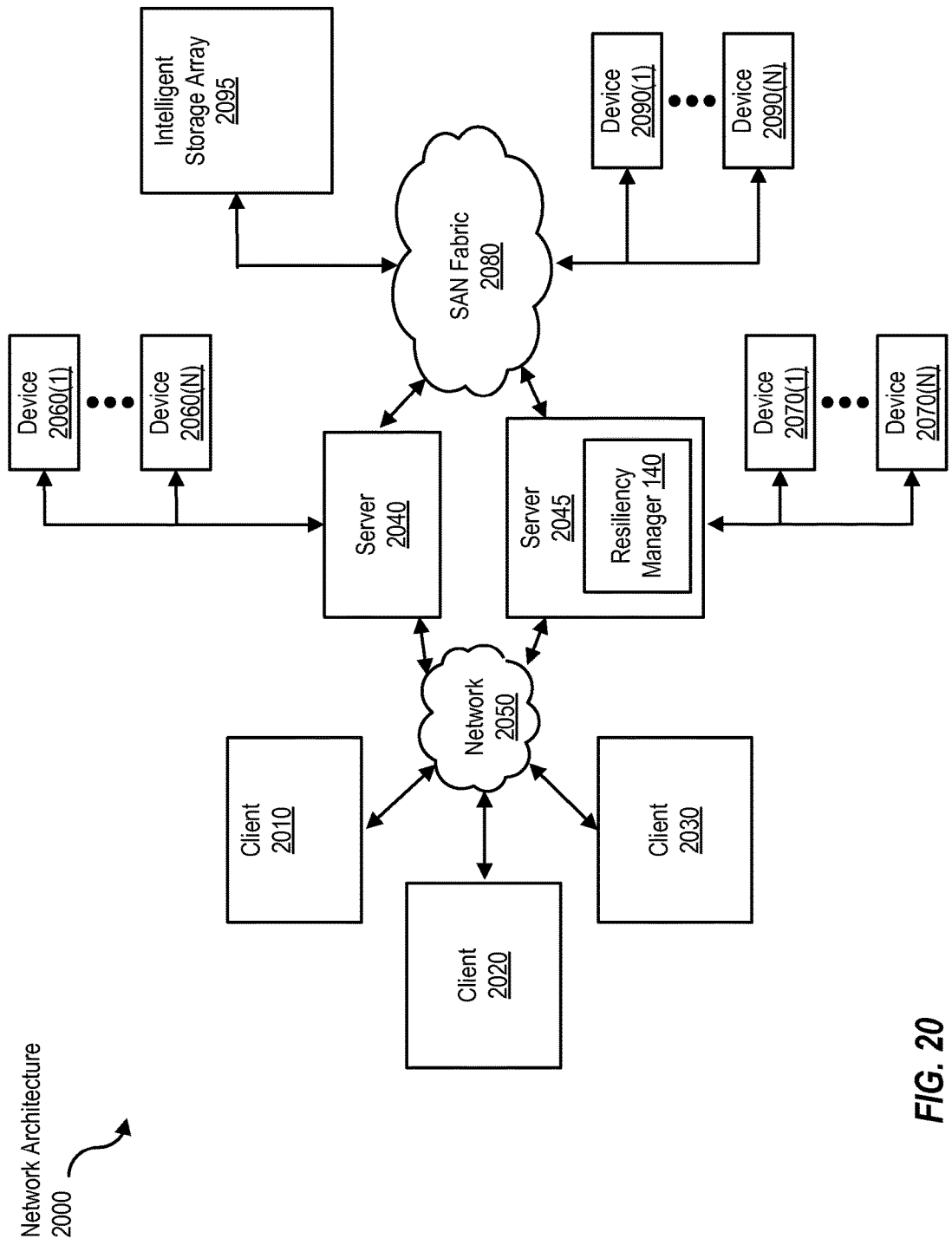
FIG. 20 is a block diagram of a networked computing system, according to the present description.

FIG. 20 is a block diagram of a network architecture 2000 in which client systems 2010, 2020, and 2030 and servers 2040 and 2045 may be coupled to a network 2050. Client systems 2010, 2020, and 2015 generally represent any type or form of computing device or system, such as computing system 1910 in FIG. 19.

Similarly, servers 2040 and 2045 generally represent computing devices or systems, such as application servers or database servers, configured to provide various database services and/or run certain software applications. Network 2050 generally represents any telecommunication or computer network including, for example, an intranet, a wide area network (WAN), a local area network (LAN), a personal area network (PAN), or the Internet. In one example, one or more of servers 2040 and 2045 and/or client systems 2010, 2020, and 2030 may include resiliency manager 140 as shown in FIG. 6.

As illustrated in FIG. 20, one or more storage devices 2040(1)-(N) may be directly attached to server 2040. Similarly, one or more storage devices 2070(1)-(N) may be directly attached to server 2045. Storage devices 2040(1)-(N) and storage devices 2070(1)-(N) generally represent any type or form of storage device or medium capable of storing data and/or other computer-readable instructions. In certain embodiments, storage devices 2040(1)-(N) and storage devices 2070(1)-(N) may represent network-attached storage (NAS) devices configured to communicate with servers 2040 and 2045 using various protocols, such as Network File System (NFS), Server Message Block (SMB), or Common Internet File System (CIFS). Such storage devices can store advisory metadata, non-advisory metadata, and file system objects, as described above.

Servers 2040 and 2045 may also be connected to a storage area network (SAN) fabric 2080. SAN fabric 2080 generally represents any type or form of computer network or architecture capable of facilitating communication between multiple storage devices. SAN fabric 2080 may facilitate communication between servers 2040 and 2045 and a plurality of storage devices 2090(1)-(N) and/or an intelligent storage array 2095. SAN fabric 2080 may also facilitate, via network 2050 and servers 2040 and 2045, communication between client systems 2010, 2020, and 2030 and storage devices 2090(1)-(N) and/or intelligent storage array 2095 in such a manner that devices 2090(1)-(N) and array 2095 appear as locally attached devices to client systems 2010, 2020, and 2030. As with storage devices 2040(1)-(N) and storage devices 2070(1)-(N), storage devices 2090(1)-(N) and intelligent storage array 2095 generally represent any type or form of storage device or medium capable of storing data and/or other computer-readable instructions.

In certain embodiments, and with reference to computing system 1910 of FIG. 19, a communication interface, such as communication interface 1922 in FIG. 19, may be used to provide connectivity between each client system 2010, 2020, and 2015 and network 2050. Client systems 2010, 2020, and 2015 may be able to access information on server 2040 or 2045 using, for example, a web browser or other client software. Such software may allow client systems 2010, 2020, and 2030 to access data hosted by server 2040, server 2045, storage devices 2040(1)-(N), storage devices 2070(1)-(N), storage devices 2090(1)-(N), or intelligent storage array 2095. Although FIG. 20 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 2040, server 2045, storage devices 2040(1)-(N), storage devices 2070(1)-(N), storage devices 2090(1)-(N), intelligent storage array 2095, or any combination thereof. All or a portion of one or more of the embodiments disclosed herein may also be encoded as a computer program, stored in server 2040, run by server 2045, and distributed to client systems 2010, 2020, and 2030 over network 2050.

In some examples, all or a portion of one of the systems in FIGS. 1, 19, and 20 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:
1. A method comprising:
initiating a disaster recovery (DR) rehearsal for a multi-tiered application, wherein
the initiating comprises
quiescing the multi-tiered application, and
in response to the quiescing, inserting a marker into a stream of data that is being replicated, wherein
the marker is inserted into the stream of data that is being replicated after the multi-tiered application has been quiesced, and
the marker indicates that the multi-tiered application has been quiesced, and
transmitting the stream of data that is being replicated, which comprises the marker, from a primary site to a secondary site;
generating a snapshot of a first storage element used by the multi-tiered application, wherein
the generating is performed in response to detecting the marker in the stream of data that is being replicated, and
the snapshot is application-consistent with regard to at least two tiers of the multi-tier application;
configuring a second storage element;
starting an instance of the multi-tiered application using the snapshot and the second storage element; and
performing the disaster recovery rehearsal, wherein
the disaster recovery rehearsal is an application-consistent disaster recovery rehearsal,
the performing comprises using the marker without querying any log files to determine where the multi-tiered application was quiesced, and
the generating, the configuring, the starting, and the performing are performed in response to the initiating.
2. The method of claim 1, wherein
the first storage element and the second storage element are located in a cloud computing environment.
3. The method of claim 1, wherein
the first storage element and the second storage element are isolated from one another.
4. The method of claim 1, further comprising:
identifying one or more storage elements associated with the multi-tiered application; and
synchronizing a pause of updates to the one or more storage elements.
5. The method of claim 1, further comprising:
replicating updates to the first storage element, wherein
the updates are being replicated to the first storage element concurrently with performance of the DR rehearsal.
6. A non-transitory computer readable storage medium comprising program instructions executable to:
initiate a disaster recovery (DR) rehearsal for a multi-tiered application, wherein
initiating the DR rehearsal comprises
quiescing the multi-tiered application, and
in response to the quiescing, inserting a marker into a stream of data that is being replicated, wherein
the marker is inserted into the stream of data that is being replicated after the multi-tiered application has been quiesced, and
the marker indicates that the multi-tiered application has been quiesced, and
transmitting the stream of data that is being replicated, which comprises the marker, from a primary site to a secondary site;
generate a snapshot of a first storage element used by the multi-tiered application, wherein
generating the snapshot is performed in response to detecting the marker in the stream of data that is being replicated, and
the snapshot is application-consistent with regard to at least two tiers of the multi-tier application;
configure a second storage element;
start an instance of the multi-tiered application using the snapshot and the second storage element; and
perform the disaster recovery rehearsal, wherein
the disaster recovery rehearsal is an application-consistent disaster recovery rehearsal,
performing comprises using the marker without querying any log files to determine where the multi-tiered application was quiesced, and generating the snapshot, configuring the second storage element, starting the instance, and performing the disaster recovery rehearsal are performed in response to initiating the DR rehearsal.

7. The non-transitory computer readable storage medium of claim 6, wherein
the first storage element and the second storage element are located in a cloud computing environment.

8. The non-transitory computer readable storage medium of claim 6, wherein the first storage element and the second storage element are isolated from one another.

9. The non-transitory computer readable storage medium of claim 6, wherein the program instructions are further executable to:
determine all storage elements associated with the multi-tiered application; and
synchronize a pause of updates to the all storage elements.

10. The non-transitory computer readable storage medium of claim 6, wherein the program instructions are further executable to:
replicate updates to the first storage element, wherein
the updates are being replicated to the first storage element concurrently with performance of the DR rehearsal.

11. A system comprising:
one or more processors; and
a memory coupled to the one or more processors, wherein the memory stores program instructions executable by the one or more processors to:
initiate a disaster recovery (DR) rehearsal for a multi-tiered application, wherein
initiating the DR rehearsal comprises
quiescing the multi-tiered application, and
in response to the quiescing, inserting a marker into a stream of data that is being replicated, wherein
the marker is inserted into the stream of data that is being replicated after the multi-tiered application has been quiesced, and
the marker indicates that the multi-tiered application has been quiesced, and
transmitting the stream of data that is being replicated, which comprises the marker, from a primary site to a secondary site;
generate a snapshot of a first storage element used by the multi-tiered application, wherein
generating the snapshot is performed in response to detecting the marker in the stream of data that is being replicated, and
the snapshot is application-consistent with regard to at least two tiers of the multi-tier application;
configure a second storage element;
start an instance of the multi-tiered application using the snapshot and the second storage element; and
perform the disaster recovery rehearsal, wherein
the disaster recovery rehearsal is an application-consistent disaster recovery rehearsal,
performing comprises using the marker without querying any log files to determine where the multi-tiered application was quiesced, and
generating the snapshot, configuring the second storage element, starting the instance, and performing the disaster recovery rehearsal are performed in response to initiating the DR rehearsal.

12. The system of claim 11, wherein
the first storage element and the second storage element are located in a cloud computing environment.

13. The system of claim 11, wherein
the first storage element and the second storage element are isolated from one another.

14. The system of claim 11, wherein the program instructions are further executable to:
determine all storage elements associated with the multi-tiered application; and
synchronize a pause of updates to the all storage elements.

15. The system of claim 11, wherein the program instructions are further executable to:
replicate updates to the first storage element, wherein
the updates are being replicated to the first storage element concurrently with performance of the DR rehearsal.

\* \* \* \* \*